US011329303B2

(12) United States Patent
Onuma et al.

(10) Patent No.: US 11,329,303 B2
(45) Date of Patent: May 10, 2022

(54) FUEL CELL SYSTEM AND METHOD FOR OPERATING THE SAME

(71) Applicant: Panasonic Intellectual Property Management Co., Ltd., Osaka (JP)

(72) Inventors: Shigenori Onuma, Kyoto (JP); Takashi Kakuwa, Osaka (JP); Yuichi Mikami, Kyoto (JP); Tomohiro Kuroha, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 251 days.

(21) Appl. No.: 16/451,165

(22) Filed: Jun. 25, 2019

(65) Prior Publication Data

US 2020/0028192 A1    Jan. 23, 2020

(30) Foreign Application Priority Data

Jul. 19, 2018    (JP) .............................. JP2018-135728
May 30, 2019    (JP) .............................. JP2019-100977

(51) Int. Cl.
*H01M 8/04955*    (2016.01)
*H01M 8/0432*    (2016.01)
(Continued)

(52) U.S. Cl.
CPC ..... *H01M 8/04955* (2013.01); *H01M 8/0432* (2013.01); *H01M 8/0488* (2013.01);
(Continued)

(58) Field of Classification Search
CPC . H01M 2008/1293; H01M 2300/0077; H01M 8/04089; H01M 8/04228;
(Continued)

(56) References Cited

U.S. PATENT DOCUMENTS

2012/0321990 A1\*  12/2012  Chang ................. H01M 8/1246
                                                                429/482
2015/0064586 A1    3/2015   Matsuo et al.
2018/0375127 A1\*  12/2018  Yamazaki ......... H01M 8/04753

FOREIGN PATENT DOCUMENTS

JP    2005-340075       12/2005
JP    2015-191833 A     11/2015
(Continued)

OTHER PUBLICATIONS

The Extended European Search Report dated May 4, 2020 for the related European Patent Application No. 19186471.9.
(Continued)

*Primary Examiner* — Adam A Arciero
(74) *Attorney, Agent, or Firm* — McDemott Will & Emery LLP

(57) ABSTRACT

A fuel cell system includes: a fuel cell stack including a plurality of cells, each of which has a fuel electrode, an air electrode, and an electrolyte, and performs a power generation by a reaction between a fuel gas and air; a fuel supplier supplying the fuel gas to the fuel electrode; an air supplier supplying the air to the air electrode; a voltage detector detecting the voltage of the fuel cell stack; and a controller stopping the supplying of the fuel gas by the fuel supplier and the supplying of the air by the air supplier when the voltage of the fuel cell stack detected by the voltage detector is decreased to be lower than a threshold voltage after the power generation of the fuel cell stack is stopped.

11 Claims, 15 Drawing Sheets

(51) Int. Cl.
*H01M 8/04537* (2016.01)
*H01M 8/04746* (2016.01)
*H01M 8/04858* (2016.01)
*H01M 8/0612* (2016.01)
*H01M 8/1253* (2016.01)
*H01M 8/12* (2016.01)

(52) U.S. Cl.
CPC ..... *H01M 8/0494* (2013.01); *H01M 8/04559* (2013.01); *H01M 8/04753* (2013.01); *H01M 8/0618* (2013.01); *H01M 8/1253* (2013.01); *H01M 2008/1293* (2013.01); *H01M 2300/0077* (2013.01)

(58) Field of Classification Search
CPC ............. H01M 8/043; H01M 8/04303; H01M 8/0432; H01M 8/0444; H01M 8/04559; H01M 8/04753; H01M 8/0488; H01M 8/0494; H01M 8/04955; H01M 8/0618; H01M 8/1246; H01M 8/1253
See application file for complete search history.

(56) References Cited

FOREIGN PATENT DOCUMENTS

WO       2005/099016 A2    10/2005
WO    WO-2017110513 A1 *  6/2017   ........ H01M 8/04228

OTHER PUBLICATIONS

The Extended European Search Report dated Jan. 7, 2020 for the related European Patent Application No. 19186471.9.

* cited by examiner

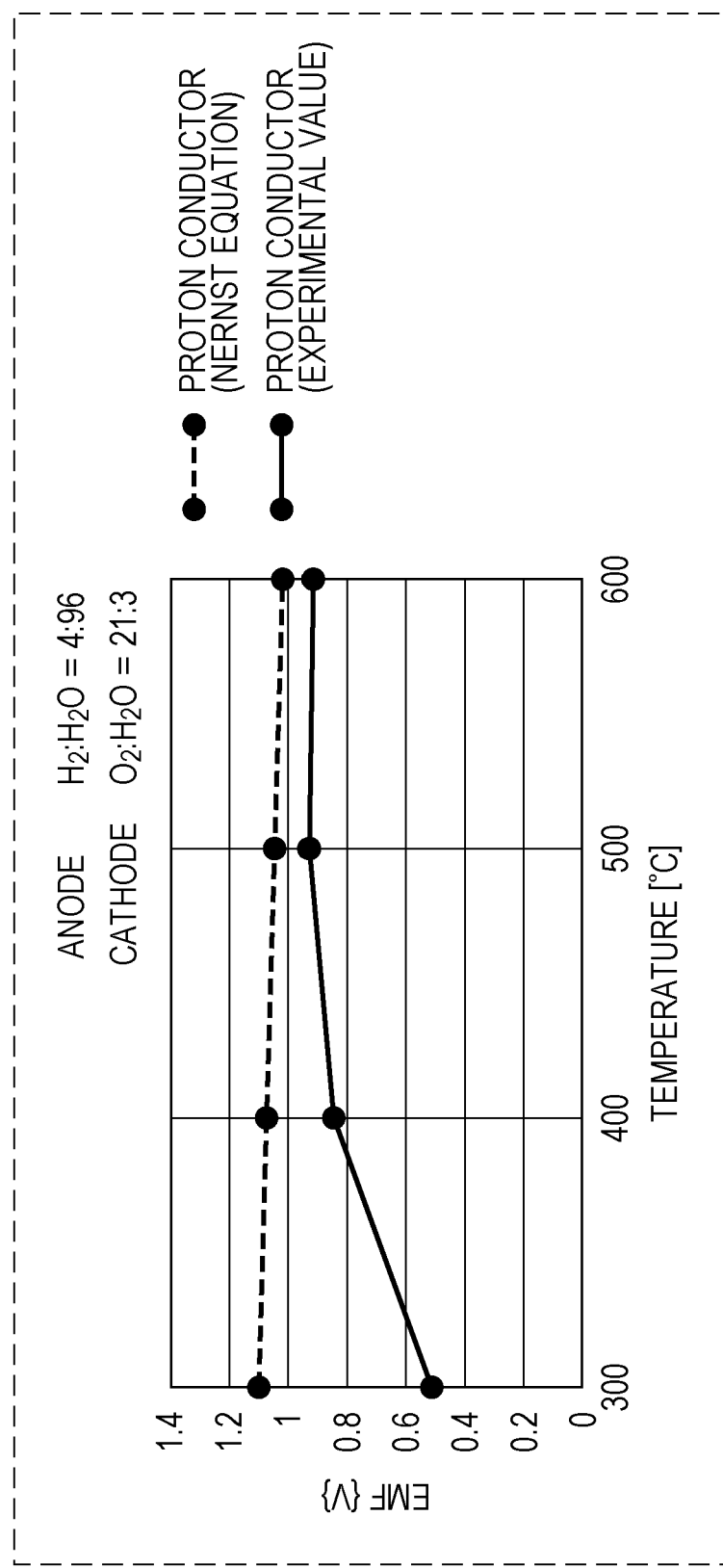

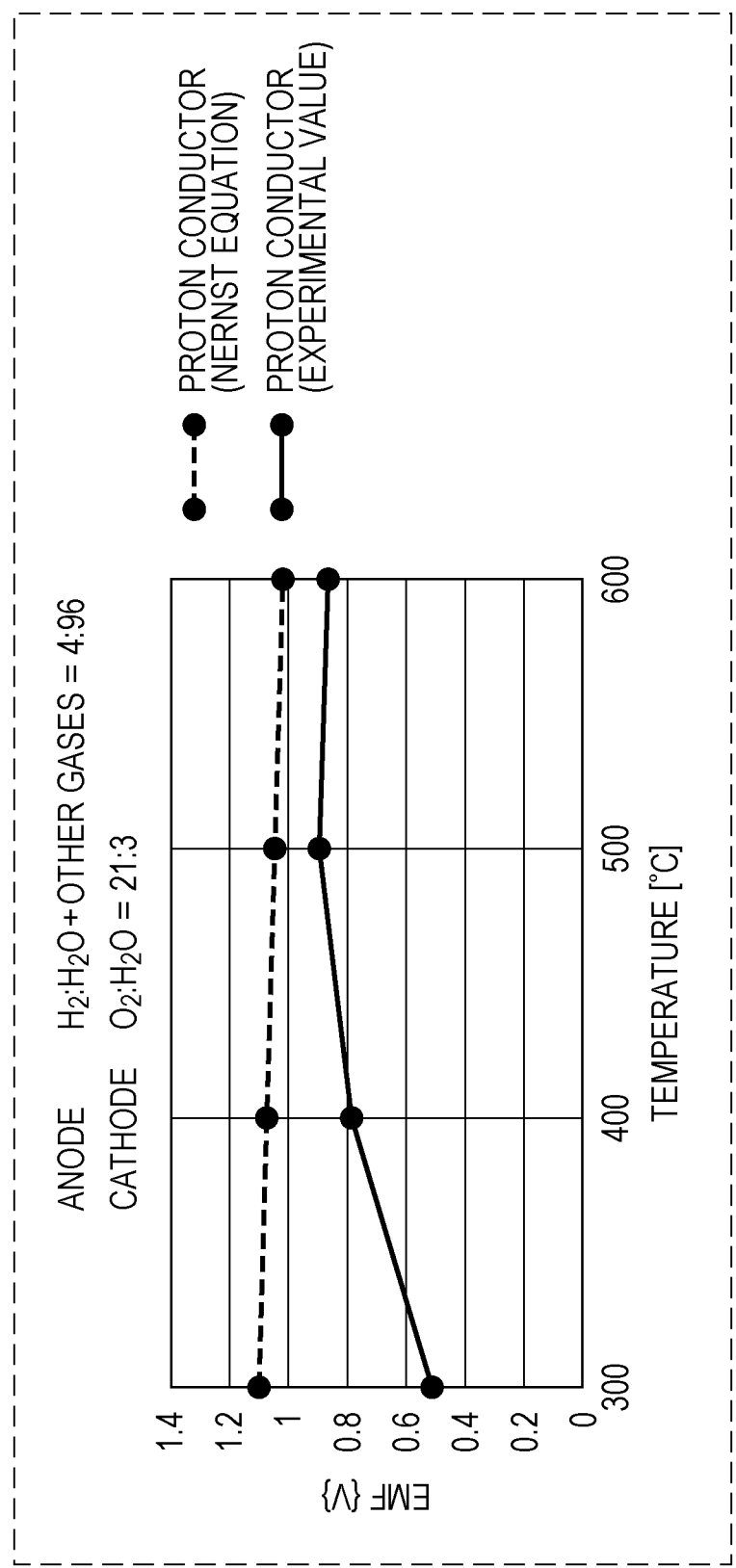

FUEL CELL SYSTEM AND METHOD FOR OPERATING THE SAME

BACKGROUND

1. Technical Field

The present disclosure relates to a fuel cell system including a fuel cell stack which performs a power generation using air and a fuel gas and a method for stopping the fuel cell system.

2. Description of the Related Art

In a fuel cell system, air and a fuel gas (hydrogen-containing gas) are supplied to a fuel cell functioning as a power generation portion to perform a power generation by an electrochemical reaction between hydrogen and oxygen.

Incidentally, in order to stop a fuel cell which is operated at a high operating temperature, since a long time is required until the temperature of the fuel cell is decreased to room temperature, a problem in that a time necessary to stop the operation is increased may arise. Hence, a technique of decreasing a stop time of a fuel cell has been proposed (Japanese Unexamined Patent Application Publication No. 2005-340075). According to the method for stopping a fuel cell disclosed in the above patent document, while air is continuously supplied to the fuel cell, a mixed gas of a hydrocarbon gas and steam, the flow rate of the hydrocarbon gas being decreased, is supplied in the fuel cell through a reformer. As described above, since the mixed gas of a hydrocarbon gas and steam, the flow rate of the hydrocarbon gas being decreased, is supplied, by the decrease in combustion heat quantity and the heat absorption of a steam reforming reaction, the decrease in temperature is not only promoted, but also by hydrogen generated by the steam reforming reaction, a reforming catalyst and an electrode of the fuel cell can be suppressed from being oxidized. In addition, when carbon precipitation occurs, precipitated carbon can be removed in the form of CO and/or $CH_4$ by a reaction with steam to be supplied.

By the method for stopping a fuel cell disclosed in Japanese Unexamined Patent Application Publication No. 2005-340075, as described above, the fuel cell can be stopped without using an inert gas.

SUMMARY

One non-limiting and exemplary embodiment provides a fuel cell system having a high reliability.

In one general aspect, the techniques disclosed here feature a fuel cell system comprising: a fuel cell stack including a plurality of cells, each of which has a fuel electrode, an air electrode, and an electrolyte, and also performs a power generation by a reaction between a fuel gas and air; a fuel supplier supplying the fuel gas to the fuel electrode; an air supplier supplying the air to the air electrode; a voltage detector detecting the voltage of the fuel cell stack; a controller stopping the supplying of the fuel gas by the fuel supplier and the supplying of the air by the air supplier when the voltage of the fuel cell stack detected by the voltage detector is decreased to be lower than a threshold voltage after the power generation of the fuel cell stack is stopped.

The fuel cell system according to the present disclosure is formed as described above and has an advantage to improve the reliability.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 16 is a graph showing another example the correlation between the temperature and the voltage of the fuel cell stack of the fuel cell system shown in FIG. 1 when the concentration of hydrogen at the fuel electrode side is out of the combustion range (4.0%); and FIG. 17 is a graph showing another example the correlation between the temperature and the voltage of the fuel cell stack of the fuel cell system shown in FIG. 2 when the concentration of hydrogen at the fuel electrode side is out of the combustion range (4.0%).

Figure 1:
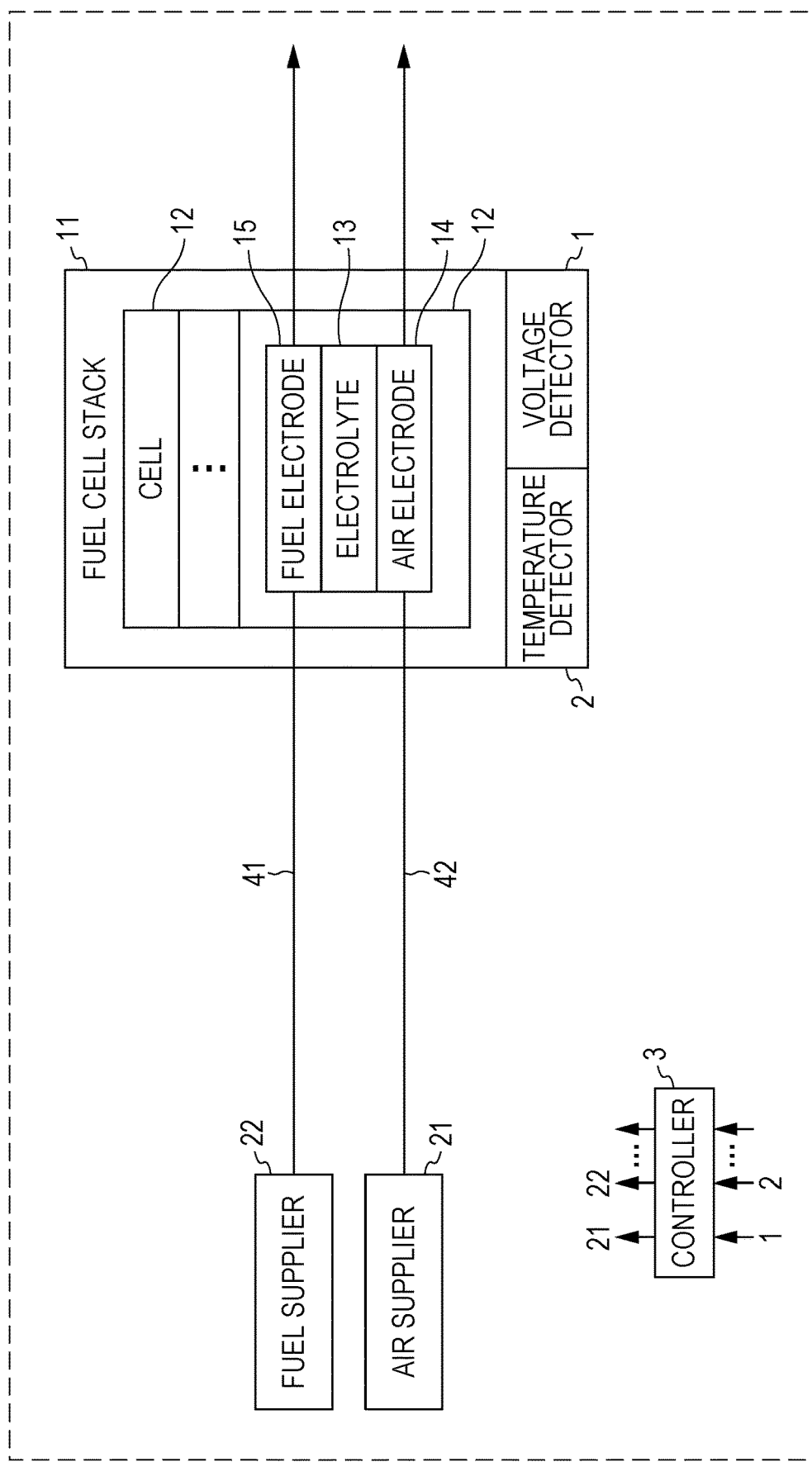
FIG. 1 is a schematic view showing one example of the structure of a fuel cell system according to an embodiment of the present disclosure.

DETAILED DESCRIPTION (Underlying Knowledge Forming Basis of the Present Disclosure)

The present inventors carried out intensive research on an operation stop control of the related fuel cell system disclosed in Japanese Unexamined Patent Application Publication No. 2005-340075. As a result, the following knowledge was obtained. That is, in the operation stop control of the fuel cell described above, first, a mixed gas containing reforming water and a hydrocarbon gas is supplied in the fuel cell through the reformer to decrease the temperature of the fuel cell. Subsequently, when the temperature of the reforming catalyst is decreased to a range of an oxidation generation temperature ±150° C., the supplying of the mixed gas is stopped. After the supplying of the mixed gas is stopped, air or a hydrocarbon gas is supplied as a purge gas in the fuel cell through the reformer to purge a remaining mixed gas.

In this case, in order to simplify the fuel cell system and to reduce the cost, the structure in which steam reforming is only performed by the reformer without providing a supply path supplying reforming air may be conceived. According to the structure as described above, in the operation stop control of the related fuel cell system, after the supplying of the mixed gas is stopped, the mixed gas is purged by a hydrocarbon gas. Hence, a problem in that a scavenging process may not be performed using safe air was found. Furthermore, when a hydrocarbon gas is supplied in the fuel cell as a purge gas, at a subsequent start of the fuel cell system, a combustible gas, such as a hydrocarbon gas, remains in the fuel cell stack. Hence, it was found that the reliability in safety may be disadvantageously degraded in such a way that explosive bonding occurs at ignition.

Through intensive research carried out on the problem described above, the present inventors discovered that in order to prevent the explosive bonding at the ignition when the fuel cell system is restarted, the concentration of a gas (combustible gas) having combustibility in the fuel cell stack may be set out of a combustion range, and in particular, the concentration of the combustible gas may be set to be lower than the lower explosive limit. In addition, when the concentration of the combustible gas in the fuel cell stack is out of the combustion range, or when the concentration of a combustible gas component is a predetermined ratio, such as 25%, or less of the lower explosive limit of the concentration of the combustible gas component which is determined by a gas sensor in order to secure the safety, the correlation between the temperature and the voltage of the fuel cell stack is obtained in advance. Furthermore, it was found that with reference to this correlation between the temperature and the voltage of the fuel cell stack obtained in advance, from the voltage value obtained based on the temperature of this fuel cell stack which is actually detected, whether the concentration of the combustible gas in the fuel cell stack is out of the combustion range or not can be judged. In addition, the voltage of the fuel cell stack in this case indicates the voltage of the stack at an extracted current of zero. The extracted current of zero indicates the state in which a circuit through which a current is extracted outside is an open circuit, and in which holes and protons, which will be described later, flow in opposite directions at the same current value between electrodes of the cell through an electrolyte. As described above, since the holes and the protons flow in the opposite directions at the same current value, the currents are counteracted therebetween, so that the current flowing between the electrodes through the electrolyte is detected as zero.

Furthermore, the correlation between the temperature and the voltage of the fuel cell stack at which nickel used for a fuel electrode is oxidized is also obtained in advance. In addition, it was also found that with reference to the predetermined correlation between the temperature and the voltage of the fuel cell stack obtained in advance, from the voltage value obtained based on the temperature of the fuel cell stack which is actually detected, whether nickel is oxidized or not can be judged.

The knowledge of the present inventors described above has not been disclosed in the past and has noble technical characteristics having significant advantages. Accordingly, in the present disclosure, in particular, the following aspects will be provided.

A fuel cell system according to a first aspect of the present disclosure includes: a fuel cell stack including a plurality of cells, each of which has a fuel electrode, an air electrode, and an electrolyte, and also performs a power generation by a reaction between a fuel gas and air; a fuel supplier supplying the fuel gas to the fuel electrode; an air supplier supplying the air to the air electrode; a voltage detector detecting the voltage of the fuel cell stack; a controller stopping the supplying of the fuel gas by the fuel supplier and the supplying of the air by the air supplier when the voltage of the fuel cell stack detected by the voltage detector is decreased to be lower than a threshold voltage after the power generation of the fuel cell stack is stopped.

According to the structure described above, when the voltage of the fuel cell stack detected by the voltage detector is lower than the threshold voltage, the controller can stop the supplying of the fuel gas and the supplying of the air. In addition, after the power generation is stopped, the change in voltage and the change in temperature of the fuel cell stack are correlated with each other. In addition, the decrease in voltage of the fuel cell stack and the decrease in concentration of the combustible component in the remaining gas in the fuel electrode are also correlated with each other. In addition, the stop of the supplying of the fuel gas and the stop of the supplying of the air may be, for example, simultaneously performed, or after the supplying of the fuel gas is stopped, the supplying of the air may be stopped.

In the case described above, for example, when the threshold voltage is set to a voltage which corresponds to the temperature (oxidation lower limit temperature) of the fuel cell stack at which nickel used for the fuel electrode is oxidized, after the temperature of the fuel cell stack is decreased to be lower than the oxidation lower limit temperature, the supplying of the fuel gas can be stopped. Hence, until the temperature of the fuel cell stack is decreased to be lower than the oxidation lower limit temperature, oxygen flowing into the fuel electrode can be purged by the fuel gas. Accordingly, nickel can be prevented from being oxidized by the oxygen flowing into the fuel electrode.

In addition, for example, when the threshold voltage is set to a voltage of the fuel cell stack at which the concentration of the combustible component in the remaining gas in the fuel electrode is decreased to be lower than the concentration at the lower explosive limit, after the concentration of the combustible component in the remaining gas is decreased to be lower than the lower explosive limit, the supplying of the air can be stopped. Accordingly, after the concentration of the combustible component in the remaining gas in the fuel electrode is decreased to be lower than the lower explosive limit, the supplying of the air is stopped, so that a series of the operation stop controls performed after the power generation stop of the fuel cell stack is instructed can be completed.

Accordingly, after the concentration of the combustible component in the remaining gas in the fuel electrode is confirmed to be lower than the lower explosive limit, the fuel cell system can be stopped. Hence, the fuel cell system according to the first aspect of the present disclosure can be stopped while the safety is secured, and in addition, the generation of explosive bonding in the fuel cell system can also be prevented at a subsequent start.

Hence, the fuel cell system according to the first aspect of the present disclosure has an advantage to improve the reliability.

According to a fuel cell system of a second aspect of the present disclosure, in the first aspect described above, the electrolyte may be a mixed conductor having an ion conductivity and an electron conductivity.

According to a fuel cell system of a third aspect of the present disclosure, in the second aspect described above, the mixed conductor may be a proton conductor.

In a fuel cell system according to a fourth aspect of the present disclosure, the fuel cell system according to any one of the first to the third aspects described above may further include a temperature detector detecting the temperature of the fuel cell stack and a storage storing a correlation between the temperature and the voltage of the fuel cell stack. The threshold voltage may be determined based on the correlation and the temperature of the fuel cell stack detected by the temperature detector.

According to the structure described above, based on the predetermined correlation described above, when the detected voltage of the fuel cell stack is lower than the threshold voltage obtained from the detected temperature of the fuel cell stack, the supplying of the fuel gas and the supplying of the air can be stopped.

For example, the predetermined correlation can be made as a correlation between the temperature (oxidation lower limit temperature) of the fuel cell stack at which nickel used for the fuel electrode is oxidized and the voltage of the fuel cell stack corresponding to the temperature. In this case, when the detected voltage of the fuel cell stack is decreased to be lower than the threshold voltage, since the supplying of the air is stopped together with the fuel gas, the air is suppressed from flowing to the fuel electrode, and hence, the oxidation of nickel can be prevented.

For example, the predetermined correlation can be made as a correlation between the temperature and the voltage of the fuel cell stack at which the concentration of the combustible component in the remaining gas in the fuel electrode is decreased to be lower than the concentration at the lower explosive limit. In the case described above, since the supplying of the air is stopped when the detected voltage of the fuel cell stack is decreased to be lower than the threshold voltage, after the concentration of the combustible component in the remaining gas in the fuel electrode is decreased to be lower than the lower explosive limit, the supplying of the air is stopped, so that the series of the operation stop controls performed after the power generation stop of the fuel cell stack is instructed can be completed.

According to a fuel cell system of a fifth aspect of the present disclosure, in the fourth aspect described above, the predetermined correlation between the temperature and the voltage of the fuel cell stack may be obtained using Nernst equation.

When the ion conduction may only be taken into consideration in the cell, for example, the correlation between the temperature and the voltage of the fuel cell stack in which the concentration of the combustible component in the remaining gas is decreased to be lower than the lower explosive limit can be obtained by Nernst equation. In addition, the voltage of the fuel cell stack at which nickel used for the fuel electrode is oxidized may be obtained from Nernst equation using the temperature as the function.

Hence, in the fuel cell system, the predetermined correlation between the temperature and the voltage of the fuel cell stack can be easily obtained.

According to a fuel cell system of a sixth aspect of the present disclosure, in the fourth aspect described above, the predetermined correlation between the temperature and the voltage of the fuel cell stack may be obtained from voltages of the fuel cell stack measured at different zero-current temperatures of the fuel cell stack where an extracted current from the fuel cell stack is zero at each of the zero-current temperatures.

When the electrolyte is a mixed conductor performing mixed conduction using protons and holes, by an influence of a leak current of holes, even if the temperature of the fuel cell stack is the same, the voltage of the fuel cell stack which is actually measured may be lower than the voltage of the fuel cell stack obtained by Nernst equation and may not coincide therewith in some cases.

According to the structure as described above, in order to obtain the predetermined correlation between the temperature and the voltage of the fuel cell stack from voltages of the fuel cell stack measured at different temperatures of the fuel cell stack at each of which the extracted current is zero, the correlation may be obtained in consideration of the influence of a leak current of holes. In addition, the extracted current of zero indicates the state in which a circuit from which a current is extracted outside is an open circuit and in which, in the cell, holes and protons flow in opposite directions at the same current between the electrodes through the electrolyte. As described above, since the holes and the protons flow in the opposite directions at the same current, the currents are counteracted therebetween, so that the current flowing between the electrodes through the electrolyte is detected as zero.

Hence, the predetermined correlation between the temperature and the voltage of the fuel cell stack can be accurately obtained.

According to a fuel cell system of a seventh aspect of the present disclosure, in any one of the first to the sixth aspects described above, the threshold voltage may be a voltage of the fuel cell stack at which the concentration of the combustible component in the remaining gas in the fuel electrode is decreased to be lower than a lower explosive limit or is decreased to a predetermined ratio or less of the lower explosive limit described above.

According to the structure described above, after the concentration of the combustible component in the remaining gas in the fuel electrode is decreased to be lower than the lower explosive limit or is decreased to the predetermined ratio or less of the lower explosive limit, the supplying of the fuel gas and the supplying of the air can be stopped.

According to a fuel cell system of an eighth aspect of the present disclosure, in the first aspect described above, the threshold voltage may be a voltage of the fuel cell stack corresponding to a lower limit of the temperature of the fuel cell stack at which nickel used for the fuel electrode is oxidized.

According to the structure described above, after the temperature of the fuel cell is decreased to be lower than the lower limit of the temperature of the fuel cell stack at which nickel used for the fuel electrode is oxidized, the supplying of the fuel gas and the supplying of the air can be stopped.

According to a fuel cell system of a ninth aspect of the present disclosure, in any one of the first to the eighth aspects described above, the electrolyte may contain an oxide containing Ba and Zr.

According to a fuel cell system of a tenth aspect of the present disclosure, in any one of the first to the ninth aspects described above, the electrolyte may contain an oxide containing Ba, Zr, and M, where M is at least one element selected from the group consisting of Sc, In, Lu, Yb, Tm, Er, Y, Ho, Dy, and Gd.

According to a fuel cell system of an eleventh aspect of the present disclosure, in any one of the first to the tenth aspects described above, the electrolyte may contain $Ba_xZr_yM_zO_{3-\delta}$, where M is at least one element selected from the group consisting of Sc, In, Lu, Yb, Tm, Er, Y, Ho, Dy, and Gd, and $0.9 \leq x \leq 1.0$, $0.6 \leq y \leq 0.90$, $0.1 \leq z \leq 0.4$, and $2.70 \leq 3-\delta \leq 2.95$.

According to a fuel cell system of a twelfth aspect of the present disclosure, in any one of the first to the eleventh aspects described above, the fuel supplier may supply a raw material gas as the fuel gas, and the fuel cell system may further include: a reformer which generates a reformed gas by reforming the raw material gas supplied by the fuel supplier using a reforming reaction and which supplies the reformed gas to the fuel electrode; an evaporator which generates steam by evaporating reforming water and supplies the steam to the reformer for the reforming reaction; and a water supplier which supplies the reforming water to the evaporator.

In addition, as the raw material gas to be supplied as the fuel gas to the fuel cell stack through the reformer, for example, a hydrocarbon gas may be mentioned.

According to the structure described above, since the reformer, the evaporator, and the water supplier are provided, by the use of the steam evaporated by the evaporator from the reforming water supplied by the water supplier, a reformed gas (hydrogen-containing gas) can be generated in the reformer from the raw material gas by steam reforming.

A method for stopping a fuel cell system according to a thirteenth aspect of the present disclosure is a method for stopping a fuel cell system. The fuel cell system includes: a fuel cell stack including a plurality of cells each of which has a fuel electrode, an air electrode, and an electrolyte and also performs a power generation by a reaction between a fuel gas and air; a fuel supplier supplying the fuel gas to the fuel electrode; an air supplier supplying the air to the air electrode; and a voltage detector detecting the voltage of the fuel cell stack, and the method includes: a step of stopping the power generation of the fuel cell stack; and when the voltage of the fuel cell stack detected by the voltage detector is decreased to be lower than a threshold voltage, a step of stopping the supplying of the fuel gas by the fuel supplier and the supplying of the air by the air supplier.

According to the method described above, when the voltage of the fuel cell stack detected by the voltage detector is decreased to be lower than the threshold voltage, the supplying of the fuel gas and the supplying of the air can be stopped. In addition, after the power generation is stopped, the change in voltage and the change in temperature of the fuel cell stack are correlated with each other. In addition, the decrease in voltage of the fuel cell stack and the decrease in concentration of the combustible component in the remaining gas in the fuel electrode are also correlated with each other. In addition, for example, when the threshold voltage is set to a voltage corresponding to the temperature (oxidation lower limit temperature) of the fuel cell stack at which nickel used for the fuel electrode is oxidized, after the temperature of the fuel cell stack is decreased to be lower than the oxidation lower limit temperature, the supplying of the fuel gas can be stopped. Hence, until the temperature of the fuel cell stack is decreased to be lower than the oxidation lower limit temperature, oxygen flowing into the fuel electrode can be purged with the fuel gas. Accordingly, nickel can be prevented from being oxidized by the oxygen flowing into the fuel electrode.

In addition, for example, when the threshold voltage is set to a voltage of the fuel cell stack at which the concentration of the combustible component in the remaining gas in the fuel electrode is decreased to be lower than the lower explosive limit, after the concentration of the combustible component in the remaining gas is decreased to be lower than the lower explosive limit, the supplying of the air by the air supplier can be stopped. Accordingly, after the concentration of the combustible component in the remaining gas in the fuel electrode is decreased to be lower than the lower explosive limit, the supplying of the air is stopped, so that the series of the operation stop controls performed after the power generation stop of the fuel cell stack is instructed can be completed.

Hence, after it is confirmed that the concentration of the combustible component in the remaining gas in the fuel electrode is decreased to be lower than the lower explosive limit, the fuel cell system can be stopped. Accordingly, the method for stopping a fuel cell system according to the thirteenth aspect of the present disclosure can stop a fuel cell system while the safety is secured and can also prevent the generation of explosive bonding in the fuel cell system at a subsequent start.

Hence, the method for stopping a fuel cell system according to the thirteenth aspect of the present disclosure has an advantage to improve the reliability.

Hereinafter, embodiments of the present disclosure will be described with reference to the drawings. In addition, through all the following drawings, constituent members equivalent or corresponding to each other are designated by the same reference numeral, and the description thereof may be omitted in some cases.

Embodiments (Structure of Fuel Cell System)

With reference to FIG. 1, the structure of a fuel cell system 100 according to an embodiment will be described. FIG. 1 is a schematic view showing one example of the structure of the fuel cell system 100 according to the embodiment of the present disclosure. In addition, in this specification, although the fuel cell system 100 will be described using, as an example, a system including solid oxide fuel cells (SOFCs) each of which uses a high-temperature solid electrolyte, the fuel cell system 100 is not limited thereto.

As shown in FIG. 1, the fuel cell system 100 has the structure including a fuel cell stack 11 formed of a plurality of cells 12, a fuel supplier 22, an air supplier 21, a temperature detector 2, a voltage detector 1, and a controller 3. Furthermore, in order to humidify a hydrogen gas which is supplied as a fuel gas, a water supplier and an evaporator, each of which is not shown, may also be included. In addition, when the information on the correlation between the temperature and the voltage of the fuel cell stack 11 after the power generation is stopped is maintained, and when the temperature of the fuel cell stack 11 can be obtained from the detection result of the voltage of the fuel cell stack 11 by the voltage detector 1 and the correlation between the temperature and the voltage described above, the temperature detector 2 is not always necessary.

In the fuel cell system 100, in response to the instruction from the controller 3, the fuel supplier 22 supplies a hydrogen gas as the fuel gas to a fuel electrode 15 of each cell 12 of the fuel cell stack 11 through a fuel gas supply path 41. The fuel supplier 22 can be made as a device capable of adjusting the flow rate of a hydrogen gas to be supplied to the fuel cell stack 11 and, for example, may be formed from a pressure booster and a flowmeter. As the pressure booster, for example, a pump may be mentioned. As the pump, for example, a motor-driven constant volume pump may be mentioned. In addition, as the flowmeter, for example, a heat quantity sensor may be mentioned.

In addition, in response to the instruction from the controller 3, the air supplier 21 supplies air to an air electrode 14 of each cell 12 of the fuel cell stack 11 through an air supply path 42. The air supplier 21 is a device capable of adjusting the flow rate of air to be supplied to the air electrode 14 of each cell 12 of the fuel cell stack 11 and, for example, may be formed from a pressure booster, such as a pump or a blower, and a flowmeter. In addition, the structure may be formed such that before the air is supplied to the fuel cell stack 11, for example, the air may be pre-heated using heat of a high-temperature exhaust gas to be discharged from the fuel cell stack 11.

The fuel cell stack 11 performs a power generation at a high temperature of 400° C. to 850° C. by an electrochemical reaction using the hydrogen gas and the air thus supplied. In addition, the structure may also be formed so that a hydrogen gas and air, each of which is not used in this power generation, are combusted in a combustion section (not shown) provided in the fuel cell stack 11.

In addition, in the fuel cell system 100 according to the embodiment, the structure is formed so that the voltage of the fuel cell stack 11 is detected by the voltage detector 1. A cell voltage applied to the cell 12 of the fuel cell stack 11 is an average cell voltage obtained by dividing the voltage of the fuel cell stack 11 by the number of cells. Hereinafter, the average cell voltage is described as the cell voltage. The voltage detector 1 transmits the value of the detected voltage to the controller 3. In addition, the fuel cell system 100 may also be formed so that the temperature of the fuel cell stack 11 is detected by the temperature detector 2. The temperature detector 2 transmits the value of the detected temperature of the fuel cell stack 11 to the controller 3.

In each of the cells 12 forming the fuel cell stack 11, the fuel electrode 15 and the air electrode 14 are disposed so as to sandwich a solid oxide electrolyte 13. For example, when the cell 12 includes an oxide ion conductor electrolyte, in the air electrode 14, an electrode reaction represented by the following Formula (1) occurs, and in the fuel electrode 15, an electrode reaction represented by the following Formula (2) occurs, so that the power generation is performed.

$$\text{Air Electrode: } O_2 + 4e^- \rightarrow 2O^{2-} \text{ (solid electrolyte)} \quad (1)$$

$$\text{Fuel Electrode: } 2O^{2-} \text{ (solid electrolyte)} + 2H_2 \rightarrow 2H_2O + 4e^- \quad (2)$$

As apparent from Formulas (1) and (2), when the cell 12 includes an oxide ion conductor electrolyte as the electrolyte 13, oxide ions move from an air electrode 14 side to a fuel electrode 15 side, and hence, steam is generated at the fuel electrode 15 side.

In addition, for example, when the cell 12 includes a proton conductor electrolyte as the electrolyte 13, in the air electrode 14, an electrode reaction represented by the following Formula (3) occurs, and in the fuel electrode 15, an electrode reaction represented by the following Formula (4) occurs, so that the power generation is performed.

$$\text{Air Electrode: } 4H^+ \text{(solid electrolyte)} + O_2 + 4e^- \rightarrow 2H_2O \quad (3)$$

$$\text{Fuel Electrode: } 2H_2 \rightarrow 4H^+ \text{(solid electrolyte)} + 4e^- \quad (4)$$

As apparent from Formulas (3) and (4), when the cell 12 includes a proton conductor electrolyte as the electrolyte 13, hydrogen moves from the fuel electrode 15 side to the air electrode 14 side, and hence, steam is generated at the air electrode 14 side. Accordingly, compared to the case in which an oxide ion conductor electrolyte is contained as the electrolyte 13, as a result, the amount of steam in the hydrogen gas (fuel gas) is decreased, and the amount of steam in the air is increased.

In addition, as the oxide ion conductor electrolyte, for example, a $ZrO_2$-based compound may be used. In particular, 8YSZ in which some of $ZrO_2$ sites are substituted by 8 percent by mole of $Y_2O_3$ is used.

In addition, as the proton conductor electrolyte, for example, a $BaZrO_3$-based compound may be used. In particular, a compound in which a part of Zr is substituted by M (at least one element selected from the group consisting of Sc, In, Lu, Yb, Tm, Er, Y, Ho, Dy, and Gd) and in which a composition ratio of Zr/M is 0.90/0.10 to 0.60/0.40 may be used. In other words, the proton conductor electrolyte may be formed of $Ba_xZr_yM_zO_{3-\delta}$ (M is at least one element selected from the group consisting of Sc, In, Lu, Yb, Tm, Er, Y, Ho, Dy, and Gd, and $0.9 \leq x \leq 1.0$, $0.6 \leq y \leq 0.90$, $0.1 \leq z \leq 0.4$, and $2.70 \leq 3-\delta \leq 2.95$ hold). In consideration of the balance between the performance and the durability, a compound in which M=0.1 to 0.2 holds is preferably used.

Incidentally, the $BaZrO_3$-based proton conductor electrolyte is also a hole conductor in the air and is also generally known as a mixed conductor having both a proton conductivity and a hole conductivity (see FIG. 11 which will be described later). When the cell 12 uses a proton conductor electrolyte, the electrolyte 13 is a mixed conductor containing a hole conductor and a proton conductor. In this case, by steam injection, since oxygen and protons enter the oxygen vacancies in the electrolyte, the proton conductivity of the proton conductor is enhanced, and hence, the water supplier and the evaporator, each of which is not shown, used to humidify a hydrogen gas (fuel gas) may also be provided.

Figure 9:
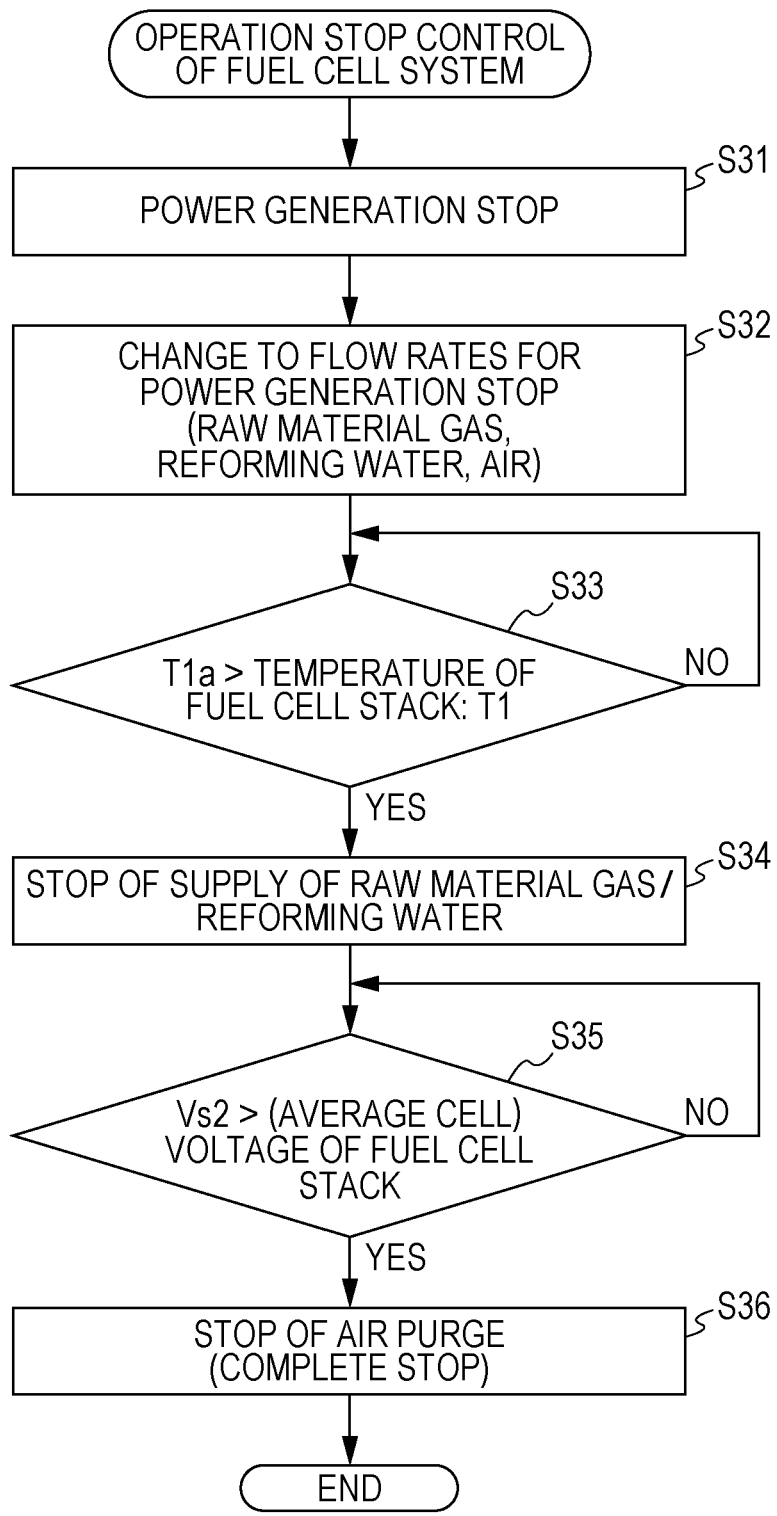
FIG. 9 is a flowchart showing one example of an operation stop control of the fuel cell system shown in FIG. 2.

In addition, in the case of a $CeO_2$-based (such as $Ce_{0.9}Gd_{0.1}O_{1.95-\delta}$ or $Ce_{0.8}Gd_{0.2}O_{1.90-\delta}$) oxide ion conductor electrolyte, at the fuel electrode 15 side, a mixed conductor containing oxide ions and electrons may be formed (see FIG. 9 which will be described later).

In addition, in this specification, although the fuel cell stack 11 which is formed of the cells 12 each using a $BaZrO_3$-based proton conductor electrolyte will be described by way of example, the fuel cell stack 11 is not limited thereto. For example, as long as the electrolyte 13 is a mixed conductor, the electrolyte is not limited to the $BaZrO_3$-based proton conductor electrolyte, and an electrolyte material functioning as another mixed conductor, such as a $CeO_2$-based oxide ion conductor electrolyte, may also be used.

Modified Example

Figure 2:
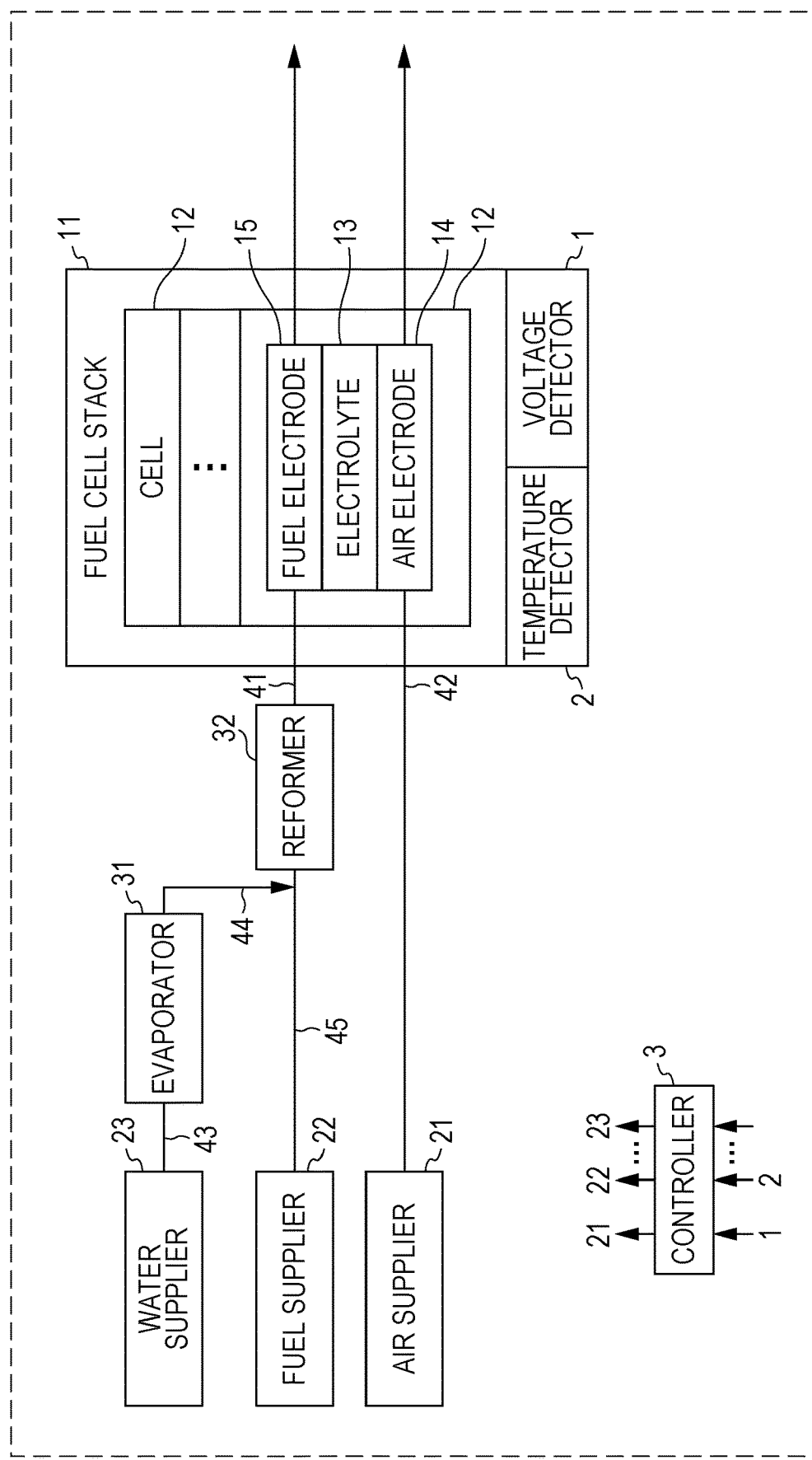
FIG. 2 is a schematic view showing one example of the structure of an important portion of a fuel cell system according to a modified example of the embodiment of the present disclosure.

Although the fuel cell system 100 according to the embodiment described above is formed so that the fuel gas (hydrogen gas) is supplied to the fuel cell stack 11 by the fuel supplier 22, as shown in FIG. 2, the fuel cell system 100 may also be formed so that a reformer 32 is further provided, and a reformed gas formed by reforming a raw material gas (such as a hydrocarbon gas) supplied by the fuel supplier 22 as the fuel gas is supplied to the fuel cell stack 11. FIG. 2 is a schematic view showing one example of the structure of an important portion of a fuel cell system 100 according to a modified example of the embodiment of the present disclosure.

That is, the fuel cell system 100 according to the modified example of the embodiment shown in FIG. 2 is different from the fuel cell system 100 according to the embodiment shown in FIG. 1 since a water supplier 23, an evaporator 31, and the reformer 32 are included in order to reform the raw material gas by steam reforming. In addition, since the fuel gas to be supplied by the fuel supplier 22 is the raw material gas, such as a hydrocarbon gas, which is not yet reformed, the fuel cell system 100 according to the modified example is different from the fuel cell system 100 according to the embodiment. As the raw material gas, for example, a hydrocarbon fuel, such as a city gas, propane, or LPG, may be mentioned. Alternatively, as the raw material gas, an alcohol, such as methanol or ethanol, may also be used.

In the fuel cell system 100 according to the modified example, in response to the instruction from the controller 3, the fuel supplier 22 supplies the raw material gas to the reformer 32 through a raw material gas supply path 45. In addition, a reformed gas (hydrogen-containing gas) generated by reforming the raw material gas by the reformer 32 is supplied to the fuel electrode 15 of each cell 12 of the fuel cell stack 11 through the fuel gas supply path 41.

In addition, in response to the instruction from the controller 3, the water supplier 23 supplies reforming water to the evaporator 31 through a water supply path 43. The water supplier 23 can be made as a device capable of adjusting the flow rate of the reforming water to be supplied to the evaporator 31 and, for example, may be formed of a pressure booster and a flowmeter. As the pressure booster, for example, a pump may be mentioned.

The reforming water supplied to the evaporator 31 is evaporated, is then fed to the raw material gas supply path 45 through a steam supply path 44, is subsequently mixed with the raw material gas passing through the raw material gas supply path 45, and is then supplied to the reformer 32. In the reformer 32, from a mixed gas containing the raw material gas and steam, a reformed gas (hydrogen-containing gas) is generated by steam reforming. The reformer 32 may be formed so that under low temperature conditions, the raw material gas is only supplied, and when the temperature of the reformer 32 is increased to a predetermined temperature or more, the reforming water is supplied so as to only perform a steam reforming reaction (SR).

<Change in Temperature of Fuel Cell Stack with Power Generation of Fuel Cell System>

Figure 3:
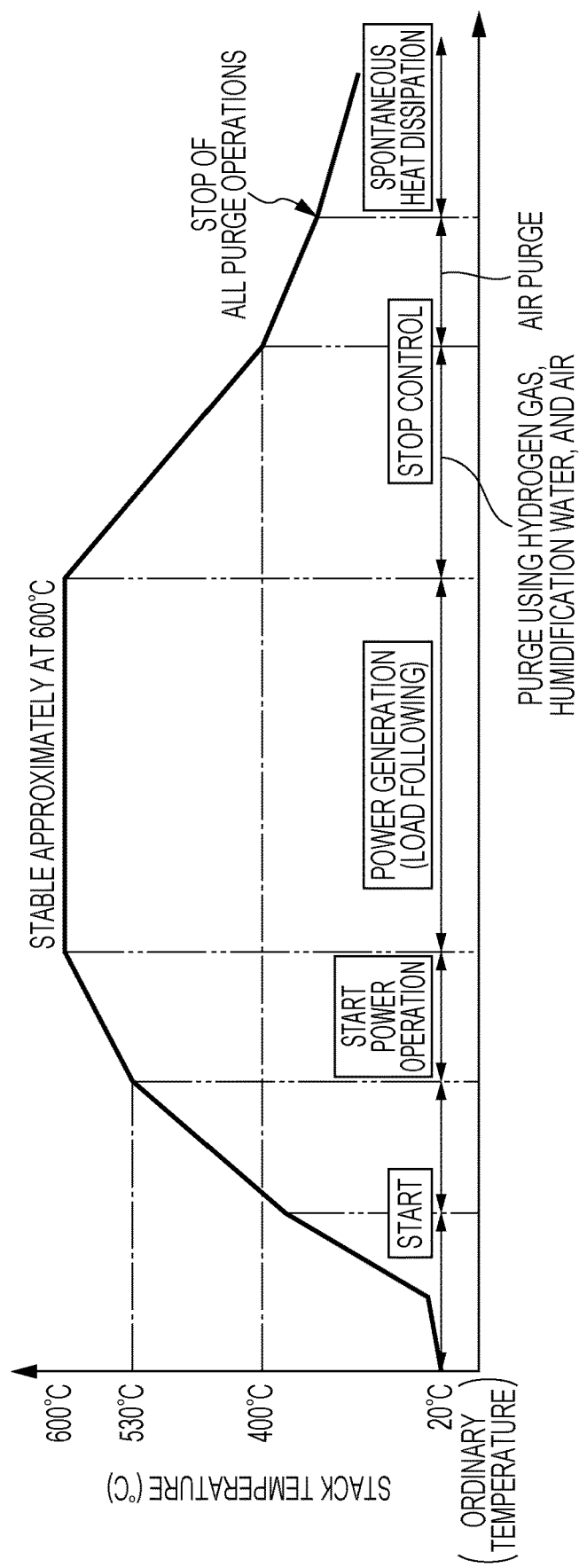
FIG. 3 is a view showing one example of the change in temperature of a fuel cell stack in association with a power generation operation of the fuel cell system according to the embodiment of the present disclosure.
Figure 4:
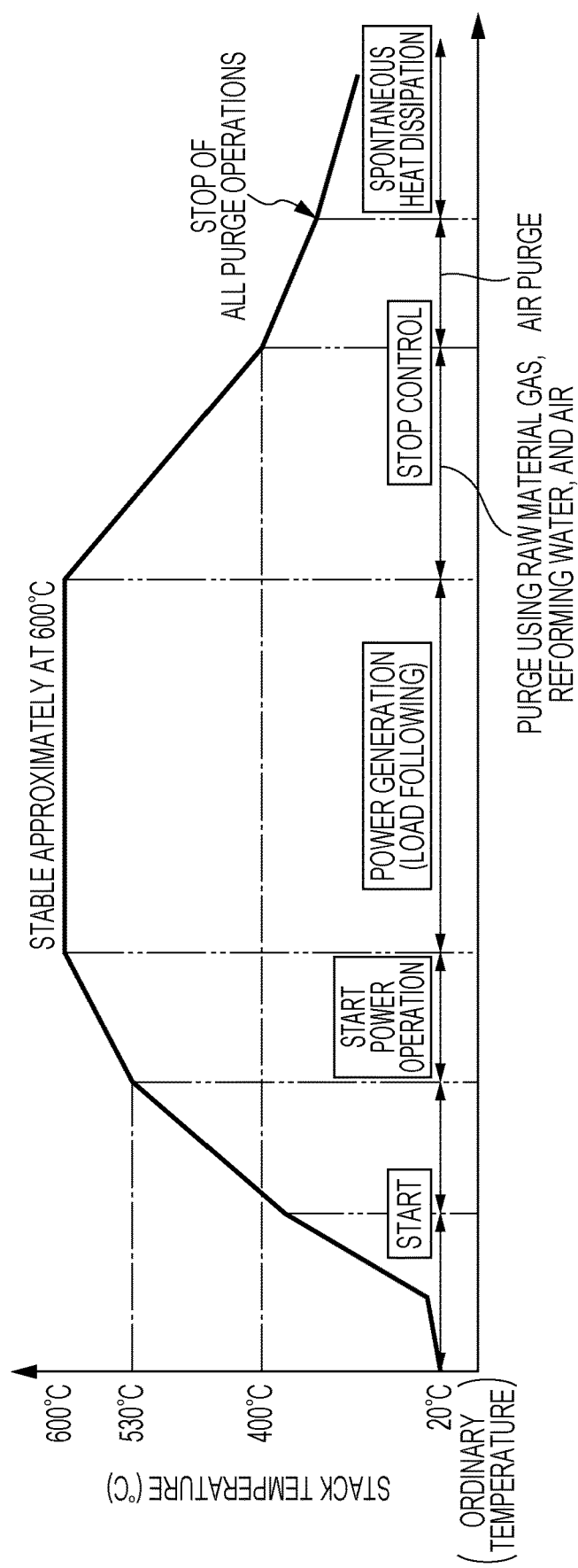
FIG. 4 is a view showing one example of the change in temperature of a fuel cell stack in association with a power generation operation of the fuel cell system according to the modified example of the embodiment of the present disclosure.

Next, one example of the change in temperature of the fuel cell stack 11 in association with a series of power generation operations from the start to the stop of the fuel cell system 100 will be described with reference to FIGS. 3 and 4. FIG. 3 is a view showing one example of the change in temperature of the fuel cell stack in association with the power generation operations of the fuel cell system 100 according to the embodiment of the present disclosure. FIG. 4 is a view showing one example of the change in temperature of the fuel cell stack in association with the power generation operations of the fuel cell system 100 according to the modified example of the embodiment of the present disclosure. As shown in FIGS. 3 and 4, between the fuel cell system 100 according to the embodiment of the present disclosure and the fuel cell system 100 according to the modified example of the embodiment of the present disclosure, although the behaviors of the changes in temperature of the fuel cell stack in association with the power generation operations are approximately equivalent to each other, in the operation stop control, the former and the latter are different from each other since the purge is performed using the fuel, humidification water, and air in the former, and in the latter, the purge is performed using the fuel, reforming water, and air.

In addition, for the convenience of illustration, the change in temperature of the fuel cell stack will be described below using the structure of the fuel cell system 100 according to the modified example.

As shown in FIG. 4, in the fuel cell system 100 according to the modified example, when the power generation is performed in accordance with the load, the temperature is required to be increased from ordinary temperature (approximately 20° C.) to a stable power generation temperature (such as approximately 600° C.). That is, when the control operation of the fuel cell system 100 according to the modified example is a start control operation, the raw material gas is fed to the cells 12 of the fuel cell stack 11 at ordinary temperature. That is, the controller 3 supplies the raw material gas and water to the fuel electrode 15 of the cell 12 through the reformer 32.

In addition, the controller 3 controls the air supplier 21 so as to feed air into the air electrode 14 of the cell 12 of the fuel cell stack 11. In addition, in a combustion section (not shown), the controller 3 combusts an anode-off gas discharged from the fuel electrode 15 of the cell 12 and a cathode-off gas discharged from the air electrode 14 of the cell 12.

By this combustion heat, the reformer 32 and the evaporator 31 are heated. In addition, after a predetermined time passes, or after the reformer 32 and the evaporator 31 are heated to a predetermined temperature or more, the raw material gas and steam obtained by evaporation in the evaporator 31 are mixed together in advance to form a mixed gas and are then supplied to the reformer 32. As described above, after the predetermined time passes, or after the reformer 32 is heated to the predetermined temperature or more, the mixed gas of the raw material gas and the steam is supplied to the reformer 32, and by a steam reforming reaction (SR), the raw material gas is reformed. Although this steam reforming reaction (SR) is an endothermic reaction, since the environment of the reformer 32 is at a sufficiently high temperature (such as approximately 500° C. to 600° C.) at this stage, the temperature of the fuel cell stack 11 can be stably increased.

When the temperature of the fuel cell stack 11 reaches a predetermined temperature lower than a rated temperature which is a temperature at which a stable power generation operation is performed at a rated load, the controller 3 controls a switch or the like (not shown) to close a power generation circuit including the fuel cell stack 11. Accordingly, the fuel cell stack 11 starts the power generation, and a current flows through the power generation circuit. In association with the power generation, since an exothermic reaction occurs, the fuel cell stack 11 itself generates heat, so that the temperature of the fuel cell stack 11 can be rapidly increased.

That is, as shown in FIG. 4, in a period after the start control operation of the fuel cell system 100 according to the modified example is started and before the temperature of the fuel cell stack 11 reaches a temperature (such as 600° C.) at which the power generation is performed so as to stably supply an electric power to an exterior load, a start power generation control operation is performed. The start power generation control operation is performed, for example, when the temperature of the fuel cell stack 11 is in a range of approximately 500° C. to less than 600° C. In order to assist the increase in temperature of the fuel cell stack 11, the increase in temperature of which is slow as compared to that of the vicinity of the combustion section, such as the reformer 32 disposed right above the combustion section, the start power generation control operation is performed to start a power generation at a predetermined value or less before a normal power generation is started.

Subsequently, in the fuel cell system 100 according to the modified example, when the controller 3 judges that a predetermined temperature or more can be stably maintained, a load following operation (power generation control operation) is started. In addition, when the fuel cell system 100 is in this load following operation state, it can be said that the normal operation is performed.

When the stop of the power generation is instructed during the power generation control operation of the fuel cell stack 11, the power generation control operation is shifted to an operation stop control (control to stop the power generation) of each of the fuel cell systems 100 according to this embodiment and to the modified example of this embodiment.

In addition, since the fuel cell systems 100 according to this embodiment and to the modified example of this embodiment each perform a power generation operation at a high temperature, in order to stop the power generation, the temperature is required to be safely decreased to ordinary temperature. However, when a long time is required to perform the operation stop control, a time required for the restart is increased, and hence, the commercial value may be degraded in some cases. Accordingly, in the fuel cell systems 100 according to this embodiment and to the modified example of this embodiment, in the operation stop control, the temperature is required to be safely and rapidly decreased without degrading the durability.

In addition, in the operation stop control of each of the fuel cell systems 100 according to this embodiment and to the modified example of this embodiment, the degradation of power generation performance caused by oxidation of a Ni metal component contained in the fuel electrode 15 of the cell 12 is required to be suppressed. In addition, as is the case of the operation stop control disclosed in Japanese Unexamined Patent Application Publication No. 2005-340075, when the mixed gas containing the reforming water and the raw material gas is supplied in the fuel cell stack 11 through the reformer 32, since steam generated by heating of the reforming water in the evaporator 31 may expel a reducing gas for the fuel electrode 15, the reducing gas may intrude into the air electrode 14 in some cases. In this case, the degradation of power generation performance caused by reduction of an air electrode material contained in the air electrode 14 is required to be suppressed, the air electrode material being $(La_{0.6}Sr_{0.4})(Co_{0.2}Fe_{0.8})O_{3-\delta}$, (LSCF), $(La_{0.6}Sr_{0.4})CoO_{3-\delta}$. (LSC), $(La_{0.8}Sr_{0.2})MnO_{3-\delta}$ (LSM), a mixture of a $BaZrO_3$-based proton conductor electrolyte and LSCF, or the like. In addition, although LSCF, LSC, and LSM each have a perovskite structure, as long as this structure can be maintained, the element ratio in each of LSCF, LSC, and LSM is not limited to the ratio (such as La, Sr, Co, Fe are 6:4:2:8) described above.

Hence, until the temperature of the fuel cell stack 11 is decreased to be lower than approximately 400° C. which is the lower limit temperature (oxidation lower limit temperature) at which a Ni metal is oxidized, the fuel cell systems 100 according to this embodiment and to the modified example of this embodiment are each required to be stopped so that the air containing oxygen is prevented from intruding into the fuel electrode 15, and the reducing gas is prevented from intruding into the air electrode 14. In the fuel cell system 100 according to the modified example of this embodiment, after the stop of the power generation is instructed, until the temperature of the fuel cell stack 11 is decreased to be lower than approximately 400° C., as shown in FIG. 4, the remaining gas is purged by supplying the fuel, the reforming water, and the air. In addition, when the temperature of the fuel cell stack 11 is decreased to be lower than approximately 400° C., the purge is performed by supplying only the air.

On the other hand, in the fuel cell system 100 according to this embodiment, as described above, the remaining gas is purged by supplying the fuel, the humidification water, and the air. In addition, when the temperature is decreased to be lower than approximately 400° C., the purge is performed by supplying only the air.

In more particular, in the fuel cell systems 100 according to this embodiment and to the modified example of this embodiment, the operation stop control is performed as described below.

(Operation Stop Control of Fuel Cell System)

Figure 5:
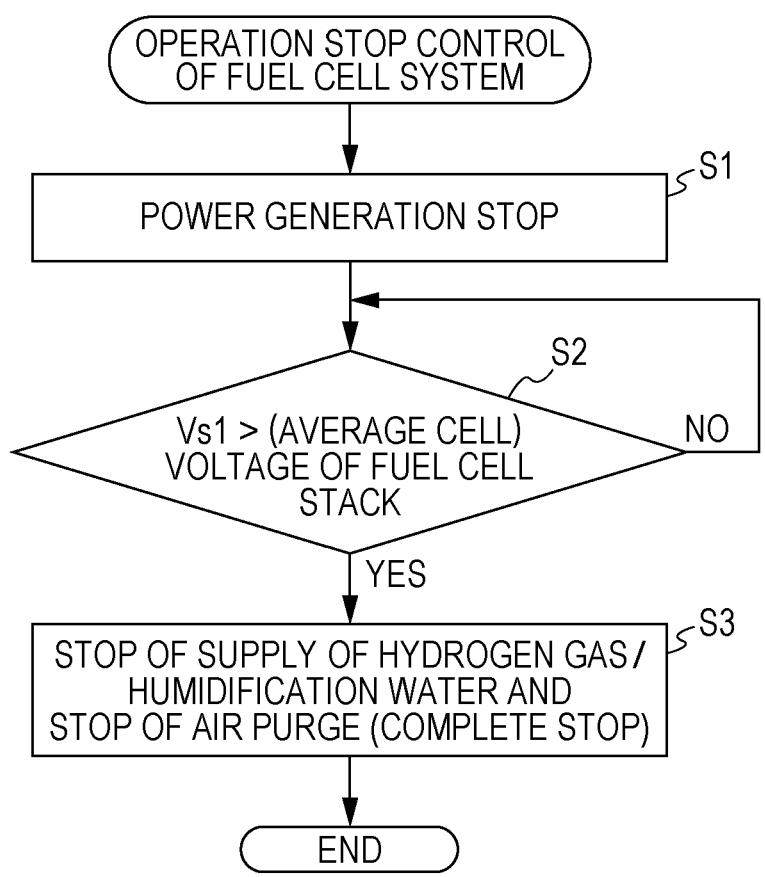
FIG. 5 is a flowchart showing one example of an operation stop control of the fuel cell system shown in FIG. 1.

First, the operation stop control of the fuel cell system 100 according to this embodiment will be described with reference to FIG. 5. FIG. 5 is a flowchart showing one example of the operation stop control of the fuel cell system 100 shown in FIG. 1.

During a normal power generation operation of the fuel cell system 100, when the instruction of the power generation stop is input, the controller 3 stops the power generation of the fuel cell stack 11 (Step S1).

Based on the detection result of the voltage detector 1, the controller 3 judges whether the voltage (average cell voltage) of the fuel cell stack 11 is decreased to be lower than a threshold voltage Vs1 or not (Step S2). In addition, after the power generation is stopped, the change in voltage of the fuel cell stack 11 and the change in temperature thereof are correlated with each other. In addition, the decrease in voltage of the fuel cell stack and the decrease in concentration of the combustible component in the remaining gas in the fuel electrode are also correlated with each other.

For example, the threshold voltage Vs1 can be set to a voltage corresponding to the temperature (oxidation lower limit temperature) of the fuel cell stack 11 at which a Ni metal used for the fuel electrode 15 is oxidized.

In the case of "NO" by the judgment in Step S2, the controller 3 repeatedly performs the judgment in Step S2. On the other hand, in the case of "YES" by the judgment in Step S2, the controller 3 controls the fuel supplier 22 and the water supplier so as to stop the supplying of the hydrogen gas and the humidification water, respectively. At the same time, the controller 3 stops the supplying of air by the air supplier 21 so as to finish the air purge at the air electrode 14 side of the fuel cell system 100 according to this embodiment (Step S3). As described above, the operation stop control of the fuel cell system 100 according to this embodiment is completed.

In the operation stop control of the fuel cell system 100 described above, for example, when the threshold voltage Vs1 is set to a voltage corresponding to the temperature (oxidation lower limit temperature) of the fuel cell stack 11 at which a Ni metal used for the fuel electrode 15 is oxidized, after the temperature of the fuel cell stack 11 is decreased to be lower than the oxidation lower limit temperature, the supplying of the hydrogen gas and the supplying of the humidification water can be stopped. Furthermore, the supplying of air can be stopped so as to complete the operation stop control of the fuel cell system 100.

Hence, until the temperature of the fuel cell stack 11 is decreased to be lower than the oxidation lower limit temperature, oxygen intruding into the fuel electrode 15 can be purged by the fuel gas. Accordingly, nickel can be prevented from being oxidized by the oxygen intruding into the fuel electrode 15.

Figure 6:
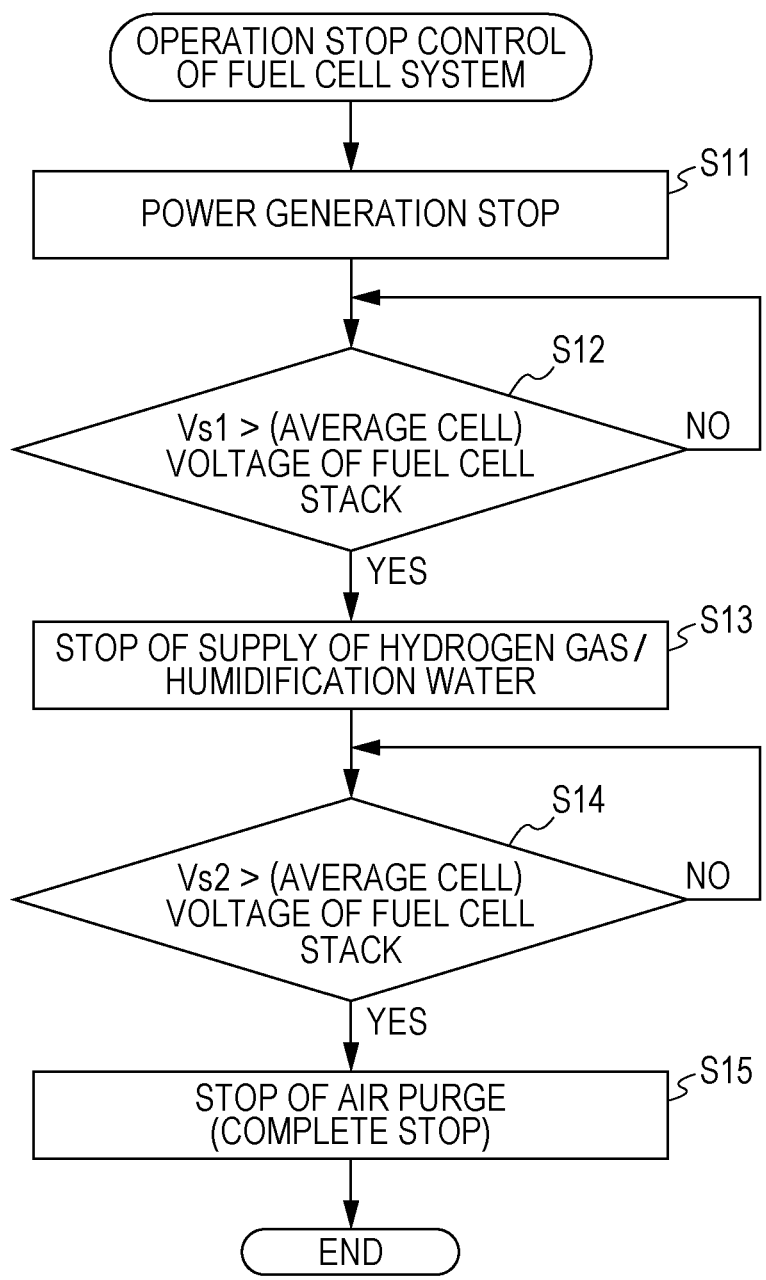
FIG. 6 is a flowchart showing another example of the operation stop control of the fuel cell system shown in FIG. 1.

Alternatively, the fuel cell system 100 may be formed so as to perform an operation stop control shown in FIG. 6. FIG. 6 is a flowchart showing another example of the operation stop control of the fuel cell system 100 shown in FIG. 1.

When the instruction of the power generation stop is input during the normal power generation operation of the fuel cell system 100, the controller 3 stops the power generation of the fuel cell stack 11 (Step S11). Based on the detection result of the voltage detector 1, the controller 3 judges whether the voltage (average cell voltage) of the fuel cell stack 11 is decreased to be lower than the threshold voltage Vs1 or not (Step S12). In the case of "NO" by the judgment in Step S12, the controller 3 repeatedly performs the judgment in Step S12. On the other hand, in the case of "YES" by the judgment in Step S12, the controller 3 controls the fuel supplier 22 and the water supplier so as to stop the supplying of the hydrogen gas and the humidification water, respectively (Step S13). Subsequently, based on the detection result of the voltage detector 1, the controller 3 judges whether the voltage (average cell voltage) of the fuel cell stack 11 is decreased to be lower than a threshold voltage Vs2 or not (Step S14). In the case of "NO" by the judgment in Step S14, the controller 3 repeatedly performs the judgment in Step S14. On the other hand, in the case of "YES" by the judgment in Step S14, the controller 3 stops the supplying of air by the air supplier 21 and finishes the air purge at the air electrode 14 side of the fuel cell system 100 according to this embodiment (Step S15). As described above, the operation stop control of the fuel cell system 100 according to this embodiment is completed.

In this case, as described above, the threshold voltage Vs1 may be set to a voltage corresponding to the temperature (oxidation lower limit temperature) of the fuel cell stack 11 at which a Ni metal used for the fuel electrode 15 is oxidized. When the threshold voltage Vs1 is set to the voltage corresponding to the oxidation lower limit temperature of a Ni metal, after the temperature of the fuel cell stack 11 is decreased to be lower than the oxidation lower limit temperature of a Ni metal, the supplying of the hydrogen gas and the humidification water can be stopped.

In addition, for example, the threshold voltage Vs2 may be set to a voltage at which the concentration of the combustible component in the remaining gas in the fuel electrode 15 is decreased to the lower explosive limit. When the threshold voltage Vs2 is set to the voltage at which the concentration of the combustible component in the remaining gas in the fuel electrode 15 is decreased to the lower explosive limit, after it is confirmed that the concentration of the combustible component (hydrogen gas) in the remaining gas is decreased to be lower than the lower explosive limit, the controller 3 can complete the operation stop control of the fuel cell system 100.

Figure 7:
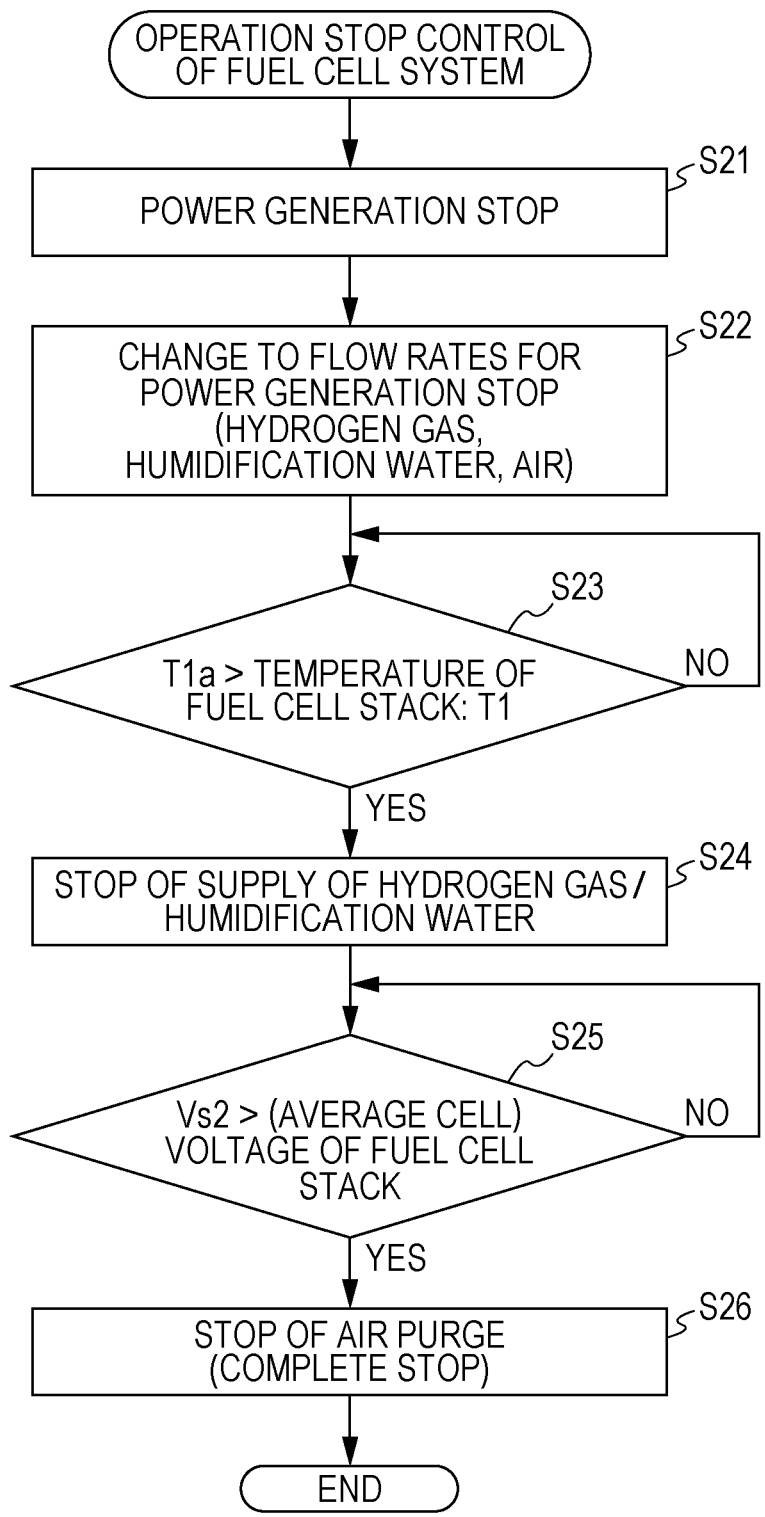
FIG. 7 is a flowchart showing another example of the operation stop control of the fuel cell system shown in FIG. 1.
Figure 8:
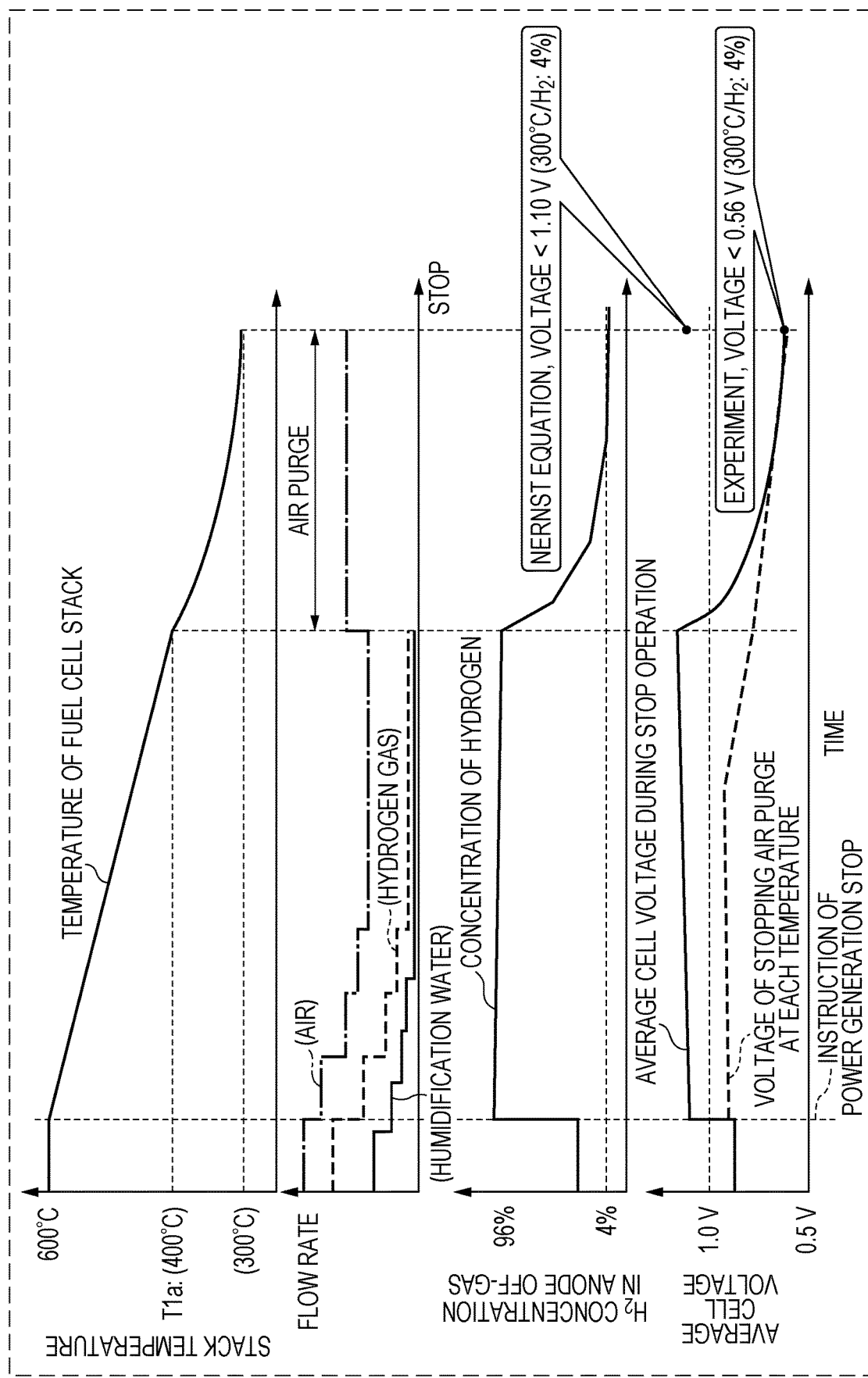
FIG. 8 is a view showing the change in temperature of the fuel cell stack of the fuel cell system shown in FIG. 1, the change in flow rate of each of air, a hydrogen gas, and humidification water, and the change in hydrogen concentration of an anode-off gas discharged from a fuel electrode.

In addition, the operation stop control of the fuel cell system 100 may also be performed as described below. Still another modified example of the operation stop control of the fuel cell system 100 according to this embodiment will be described with reference to FIGS. 7 and 8. FIG. 7 is a flowchart showing one example of the operation stop control of the fuel cell system 100 shown in FIG. 1. FIG. 8 is a view showing the change in temperature of the fuel cell stack 11 of the fuel cell system 100 shown in FIG. 1, the change in flow rate of each of the air, the hydrogen gas (fuel gas), and the humidification water, and the change in hydrogen concentration of an anode-off gas discharged from the fuel electrode 15.

In addition, in this case, the hydrogen concentration of the anode-off gas is regarded as the hydrogen concentration in a gas remaining in the fuel electrode 15 and the fuel gas supply path 41 (hereinafter, collectively referred to as "at the fuel electrode 15 side"). In addition, as shown in FIG. 8, the hydrogen concentration of the anode-off gas during the power generation of the fuel cell system 100 is approximately 23% as the balance excluding a humidification component (humidification water), and the hydrogen concentration of the anode-off gas in a certain period of time (period until the supplying of the hydrogen gas and the humidification water is stopped) immediately after the instruction of the power generation stop is input is, as shown in FIG. 8, approximately 96% as the balance excluding the humidification component (humidification water).

When the instruction of the power generation stop is input during the normal power generation operation of the fuel cell system 100, the controller 3 stops the power generation of the fuel cell stack 11 (Step S21). In addition, the controller 3 controls the fuel supplier 22, the water supplier not shown, and the air supplier 21 so as to change the flow rates of the hydrogen gas, the humidification water, and the air to be supplied to the fuel cell stack 11 to the respective flow rates for the power generation stop (Step S22). That is, as shown in FIG. 8, the controller 3 controls the fuel supplier 22 and the water supplier so as to decrease the flow rates of the hydrogen gas and the humidification water, respectively, in a stepwise manner. In addition, as for the humidification water, the flow rate thereof may be decreased before the instruction of the power generation stop is received.

In addition, after the power generation stop is instructed, the controller 3 may control the air supplier 21 so that the flow rate of the air is decreased in a stepwise manner in accordance with the decrease in temperature of the fuel cell stack 11. Alternatively, the controller 3 may control the air supplier 21 so that after the power generation stop is instructed, the flow rate of the air is increased once and is then decreased in a stepwise manner.

That is, in order to promote the decrease in temperature of the fuel cell stack 11, as for the flow rates for the power generation stop immediately after the power generation stop is instructed, the flow rate of the air may only be set to be higher than that in the rated power generation. As described above, immediately after the power generation stop is instructed, even when the air is supplied at a higher flow rate than that in the rated power generation, the temperature of the entire fuel cell stack 11 is still high, such as 500° C. or more, and as shown in FIG. 8 in which the change in anode-off gas composition is shown, the hydrogen concentration in the anode-off gas is sufficiently high, such as 90% or more. However, after the power generation stop is instructed, as the temperature of the fuel cell stack 11 is decreased, the flow rate of the air to be supplied may be decreased.

As described above, since the hydrogen gas and the humidification water are continuously supplied at the flow rates for the power generation stop, the combustion is continued in the combustion section; however, since the flow rate of the air to be supplied is sufficiently high, the heat is discharged in the form of an exhaust gas, and the temperature of the fuel cell stack 11 is gradually decreased.

In addition, the controller 3 judges whether a temperature T1 of the fuel cell stack 11 detected by the temperature detector 2 is decreased to be lower than a predetermined temperature (first temperature) T1*a* (such as 400° C.) corresponding to the oxidation lower limit temperature of a Ni metal or not (Step S23). When the controller 3 judges that the temperature T1 of the fuel cell stack 11 is decreased to be lower than the predetermined temperature T1*a* ("YES" in Step S23), the controller 3 controls the fuel supplier 22 and the water supplier to stop the supplying of the hydrogen gas and the humidification water, respectively (Step S24). In addition, the supplying of the air is maintained as shown in FIG. 8, and the temperature T1 of the fuel cell stack 11 is further decreased. In addition, while the temperature T1 of the fuel cell stack 11 is the predetermined temperature T1*a* or more ("NO" in Step S23), the judgment in Step S23 is repeatedly performed. In addition, when the temperature T1 of the fuel cell stack 11 is decreased to be lower than the predetermined temperature T1*a*, the flow rate of the air is increased so as to decrease the temperature of the fuel cell stack 11 and so as to perform the air purge at the air electrode side. In addition, in order to increase the rate of temperature decrease, although the flow rate of the air is preferably increased, the method to increase the rate of temperature decrease is not limited thereto, and the flow rate of the air may be maintained or may be decreased.

As described above, when the temperature T1 of the fuel cell stack 11 detected by the temperature detector 2 is decreased to be lower than the predetermined temperature T1*a* corresponding to the oxidation temperature of a Ni metal, the supplying of the hydrogen gas and the humidification water is stopped. On the other hand, until the hydrogen concentration (concentration of the combustible component) in the remaining gas at the fuel electrode 15 side reaches a safe concentration (concentration lower than the lower explosive limit, such as 4.0% or less in the case of hydrogen) at which no explosive bonding occurs when the fuel cell system 100 is restarted, the supplying of the air is maintained. Alternatively, until the concentration of the combustible component reaches a predetermined ratio (predetermined rate) or less of the lower explosive limit (such as a predetermined ratio of 1/4 or less with respect to 4.0% of hydrogen, that is, a hydrogen concentration of 1.0% or less), the air supply may be maintained.

In this embodiment, whether the hydrogen concentration in the remaining gas at the fuel electrode 15 side reaches a safe concentration or not is judged as described below. That is, the judgment is performed whether the voltage detected by the voltage detector 1 is decreased to be lower than the threshold voltage Vs2 or not at a predetermined temperature, the threshold voltage (predetermined value) Vs2 being obtained based on the correlation between the temperature and the voltage of the fuel cell stack 11 in which the hydrogen concentration in the remaining gas at the fuel electrode 15 side is decreased to be lower than the lower explosive limit or is decreased to a predetermined ratio or less of the lower explosive limit. In this embodiment, the combustion range indicates a range of the ratio of the combustible gas to the air at which combustion can be carried out.

That is, although the details will be described later, when the hydrogen concentration in the remaining gas at the fuel electrode 15 side is lower than the lower explosive limit, the temperature and the voltage of the fuel cell stack 11 are correlated with each other (for example, see FIG. 14 which will be described later). Accordingly, the fuel cell system 100 may be formed so that from the value of the voltage of the fuel cell stack 11 at a predetermined temperature (second temperature), the hydrogen concentration in the remaining gas is estimated. In particular, as shown in FIG. 7, based on the respective detection results of the voltage detector 1 and the temperature detector 2, the controller 3 judges whether the voltage (average cell voltage) of the fuel cell stack 11 at the predetermined temperature (second temperature) is lower than the threshold voltage Vs2 or not (Step S25). That is, it is judged whether or not the voltage of the fuel cell stack 11 detected by the voltage detector 1 is decreased to be lower than the threshold voltage obtained based on the correlation between the temperature and the voltage of the fuel cell stack 11 at which the concentration of the combustible component in the remaining gas in the fuel electrode 15 is decreased to be lower than the lower explosive limit.

In addition, the voltage of the fuel cell stack 11 described above is a voltage when the current extracted to an external circuit is zero and indicates the average voltage of the cell 12. In addition, in the fuel cell system 100, as the concentration of the hydrogen gas in the remaining gas lower than the lower explosive limit, a concentration of 4.0% is set. In addition, the hydrogen concentration lower than the lower explosive limit is not limited to the above 4.0% but may be set to a concentration at a predetermined ratio of 25% lower explosive limit which is generally set by a gas leak detector or the like. For example, the hydrogen concentration may be set to 1.0% which is 25% of the lower explosive limit, to 0.4% at a predetermined ratio of 1/10, or to another concentration at another predetermined ratio.

In addition, the predetermined temperature (second temperature) used for the judgment in Step S25 is a temperature range lower than the predetermined temperature T1*a* and is an arbitrarily determined temperature in a temperature range in which even if the supplying of the air to the air electrode 14 of each cell 12 of the fuel cell stack 11 is stopped, the temperature of the fuel cell stack 11 can be decreased to ordinary temperature within a desired period. In this temperature range, as the predetermined temperature (second temperature), for example, a plurality of temperatures, such as 350° C., 300° C., 250° C., and so on, may be set in a stepwise manner.

In the case of "YES" in Step S25, the controller 3 stops the supplying of the air by the air supplier 21 and finishes the air purge at the air electrode 14 side (Step S26). By the steps described above, the operation stop control of the fuel cell system 100 according to this embodiment is performed.

In addition, in the case of "NO" in Step S25, based on the respective detection results of the voltage detector 1 and the temperature detector 2, from the correlation between the temperature and the voltage (average cell voltage) of the fuel cell stack 11, the controller 3 repeatedly performs a judgment treatment until the voltage detected at the predetermined temperature (second temperature) is decreased to be lower than the threshold voltage Vs2 (Step S25).

Figure 10:
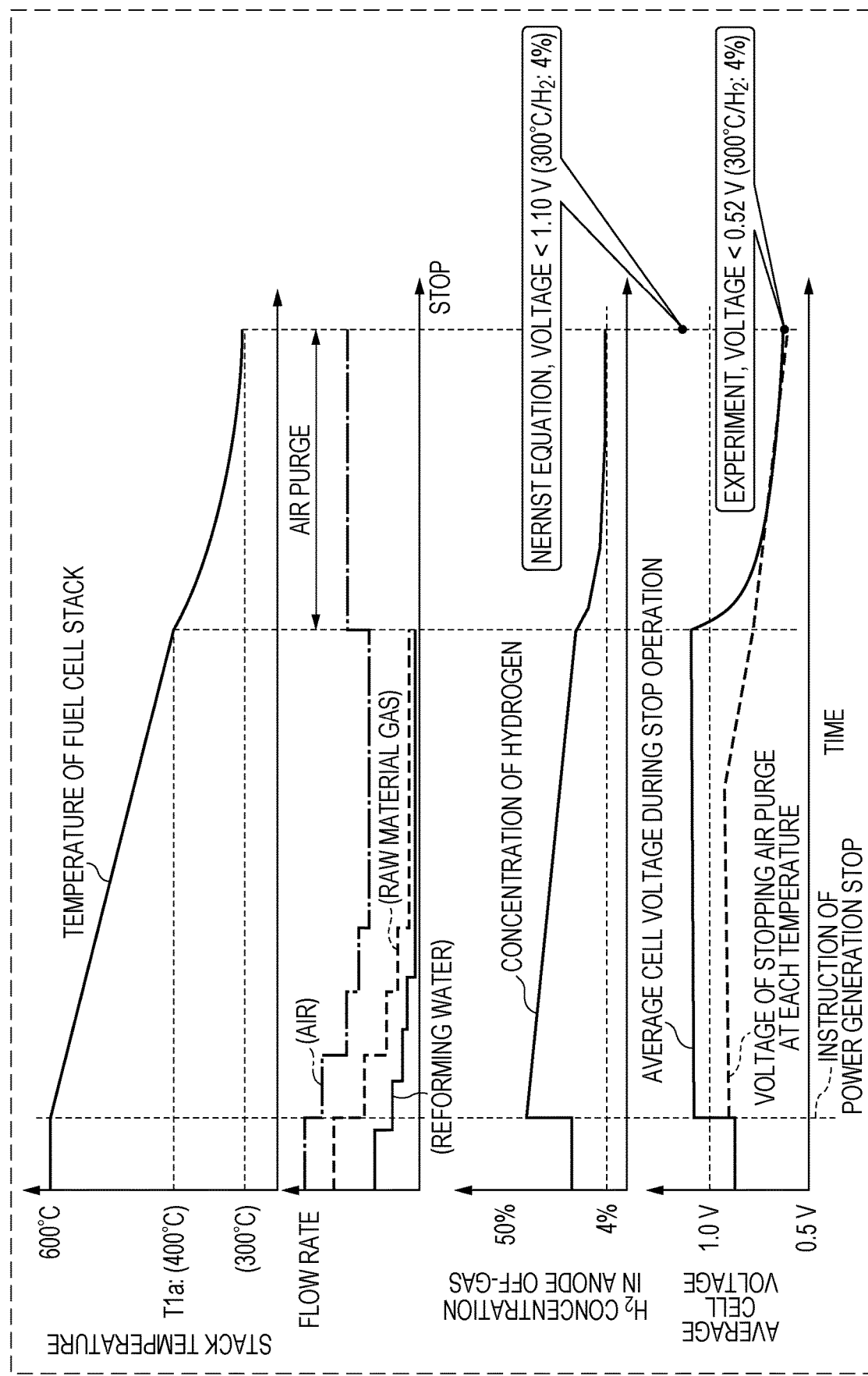
FIG. 10 is a view showing the change in temperature of the fuel cell stack of the fuel cell system shown in FIG. 2, the change in flow rate of each of air, a raw material gas (hydrocarbon gas), and reforming water, and the change in hydrogen concentration of an anode-off gas discharged from a fuel electrode.

On the other hand, in the fuel cell system 100 according to the modified example of this embodiment, the operation stop control is performed as described below. Hereinafter, with reference to FIGS. 9 and 10, the operation stop control will be described. FIG. 9 is a flowchart showing one example of the stop control of the fuel cell system 100 shown in FIG. 2. FIG. 10 is a view showing the change in temperature of the fuel cell stack 11 of the fuel cell system 100 shown in FIG. 2, the change in flow rate of each of the air, the raw material gas, and the reforming water, and the change in hydrogen concentration in an anode-off gas discharged from the fuel electrode 15.

In addition, the hydrogen concentration in the anode-off gas is regarded as the hydrogen concentration in the remaining gas in the fuel electrode 15 and the fuel gas supply path 41 (hereinafter, collectively referred to as "at the fuel electrode 15 side). In addition, as shown in FIG. 10, the hydrogen concentration in the anode-off gas during the power generation of the fuel cell system 100 according to the modified example of this embodiment is approximately 22% as the balance excluding gas components other than the reforming water and hydrogen and is approximately 50% immediately after the instruction of the power generation stop is input. Subsequently, the amount of the reformed gas generated by a reforming reaction is decreased as the temperature of the fuel cell stack 11 is decreased, and hence, the hydrogen concentration is gradually decreased.

The operation stop control of the fuel cell system 100 according to the modified example of this embodiment is similar to the operation stop control of the fuel cell system 100 according to this embodiment shown in FIG. 7 except for that the materials used for the purge are different from those described above. Accordingly, since S31, S33, S35, and S36 of the flowchart shown in FIG. 9 are similar to Step S21, Step S23, Step S25, and Step S26 of the flowchart shown in FIG. 7, the description thereof will be omitted.

When the instruction of the power generation stop is input in Step S31, and the power generation of the fuel cell stack 11 is stopped, the controller 3 controls the fuel supplier 22, the water supplier 23, and the air supplier 21 to change the flow rates of the raw material gas, the reforming water, and the air, which are supplied to the fuel cell stack 11, to the respective flow rates for the power generation stop (Step S32).

That is, as shown in FIG. 10, the controller 3 controls the fuel supplier 22 and the water supplier 23 so as to decrease the flow rates of the raw material gas and the reforming water, respectively, in a stepwise manner. In addition, before the instruction of the power generation stop is received, the flow rate of the reforming water to be supplied may be decreased in advance.

In addition, after the power generation stop is instructed, the controller 3 may be formed to control the air supplier 21 so that the flow rate of the air is decreased in a stepwise manner in accordance with the decrease in temperature of the fuel cell stack 11. Alternatively, after the power generation stop is instructed, the controller 3 may be formed to control the air supplier 21 so that the flow rate of the air is increased once and is then decreased in a stepwise manner.

For example, during the rated power generation of the fuel cell system 100, as a general household fuel cell, a power corresponding to AC700 W (rated) is to be supplied at a fuel utilization of 80%, an air flow rate of 45 NL/min, and S/C=2.5 using a raw material gas (hydrogen at a flow rate of 9.0 NL/min and a city gas 13A at a flow rate of 2.0 NL/min). In the case described above, the respective flow rates for the power generation stop are decreased in a stepwise manner so as to supply a raw material gas (hydrogen at a flow rate of 2.5 NL/min and a city gas 13A at a flow rate of 0.5 NL/min). In addition, in the case of the reforming water, the flow rate thereof is decreased in a stepwise manner so as to satisfy an S/C of 2.0 to 2.5 as a molar ratio when the carbon component in the hydrocarbon fuel is represented by C, and the amount of steam is represented by S. On the other hand, in order to promote the decrease in temperature of the fuel cell stack 11, immediately after the power generation stop is instructed, the air is supplied at a flow rate of 50 NL/min.

As described above, since the raw material gas and the reforming water are continuously supplied at the flow rates for the power generation stop, although the combustion is continued in the combustion section, since the flow rate of the air to be supplied is sufficiently high, the heat is discharged in the form of an exhaust gas, and hence, the temperature of the fuel cell stack 11 is gradually decreased.

In addition, when the temperature T1 of the fuel cell stack 11 detected by the temperature detector 2 is judged to be lower than the predetermined temperature (first temperature) T1a (such as 400° C.) corresponding to the oxidation lower limit temperature of a Ni metal ("YES" in Step S33), the controller 3 controls the fuel supplier 22 and the water supplier 23 to stop the supplying of the raw material gas and the reforming water, respectively (Step S34). In addition, since the supplying of the air is maintained as shown in FIG. 10, the temperature T1 of the fuel cell stack 11 is further decreased, and in addition, the air purge is performed at the air electrode side. In addition, although the flow rate of the air is preferably increased in order to promote the decrease in temperature, the method to promote the decrease in temperature is not limited thereto, and the flow rate of the air may be maintained or may be decreased.

As described above, when the temperature T1 of the fuel cell stack 11 detected by the temperature detector 2 is lower than the predetermined temperature T1a corresponding to the oxidation temperature of a Ni metal, the supplying of the raw material gas and the reforming water is stopped. On the other hand, until the hydrogen concentration (concentration of the combustible component) in the remaining gas at the fuel electrode 15 side is decreased to a safe concentration (concentration lower than the lower explosive limit, such as 4.3% or less when the raw material gas is a city gas 13A, that is, 4.0% or less on a hydrogen basis) at which no explosive bonding occurs at the restart of the fuel cell system 100, the supplying of the air is maintained. In addition, until the concentration of the combustible component is decreased to a predetermined ratio (predetermined rate) or less of the lower explosive limit, for example, to a predetermined ratio of 25% or less of 4.0% of hydrogen (that is, to a hydrogen concentration of 1.0% or less), the supplying of the air may be maintained.

In addition, as shown in FIGS. 8 and 10, after the supplying of the hydrogen gas and the humidification water is stopped, or after the supplying of the raw material gas and the reforming water is stopped, the hydrogen concentration in the anode-off gas is gradually decreased.

Figure 11:
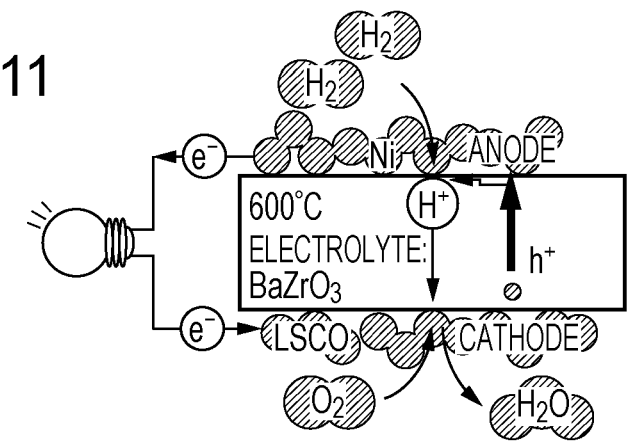
FIG. 11 is a schematic view showing the movement of protons and holes when an electrolyte of the fuel cell system shown in each of FIGS. 1 and 2 is a proton conductor electrolyte.

The reason for this is that, for example, when the electrolyte 13 of the cell 12 is a proton conductor electrolyte, as shown in FIG. 11, hydrogen in the remaining gas at the fuel electrode 15 side moves as protons to the air electrode 14 through the electrolyte 13 and generates steam by a reaction with oxygen of the air electrode 14. Since this generation is continuously performed after the supplying of the hydrogen gas and the humidification water is stopped, or after the supplying of the raw material gas and the reforming water is stopped, the hydrogen in the remaining gas at the fuel electrode 15 side is consumed and can be decreased to a safe concentration. In addition, FIG. 11 is a view schematically showing the movement of protons and holes when the electrolyte 13 of the fuel cell system 100 shown in one of FIGS. 1 and 2 is a proton conductor electrolyte. FIG. 11 shows one example of a power generation principle when the cell 12 of the fuel cell system 100 uses a proton conductor electrolyte as the electrolyte 13. In addition, in FIG. 11, [h$^+$] indicates the movement of holes (positive holes).

Figure 12:
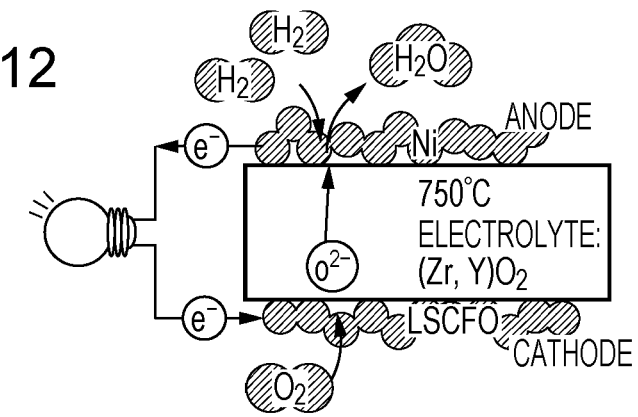
FIG. 12 is a schematic view showing the movement of oxide ions when the electrolyte of the fuel cell system shown in each of FIGS. 1 and 2 is an oxide ion conductor electrolyte.

On the other hand, when the electrolyte 13 of the cell 12 is an oxide ion conductor electrolyte, during the power generation, as shown in FIG. 12, oxygen flowing at the air electrode 14 side moves as oxide ions to the fuel electrode 15 through the electrolyte 13 and generates steam by a reaction with hydrogen of the fuel electrode 15 (steam generation reaction).

However, when YSZ which is a typical oxide ion conductor electrolyte is used, after the power generation is stopped, and the stop operation is started, since the conductivity of the oxide ion itself is higher than the conductivity of electrons or holes by two digits or more, the leak current may be substantially ignored. Hence, an electrochemical steam generation reaction may occur at the electrode so as to be substantially ignored. That is, after the supplying of the hydrogen gas and the humidification water is stopped, or after the supplying of the raw material gas and the reforming water is stopped, no steam generation reaction continuously occurs, and hence, hydrogen in the remaining gas at the fuel electrode 15 side is not consumed. Accordingly, the hydrogen concentration in the remaining gas cannot be decreased to a safe concentration. Hence, when an electrolyte formed of a mixed conductor is not used, water remaining in the evaporator 31 and the path supplying the reforming water to the evaporator 31 is evaporated by residual heat for the purge. Alternatively, the supplying of the fuel is only stopped in advance when the temperature of the fuel cell stack 11 reaches T1$a$, and so-called steam purge is performed by supplying only the reforming water for a while.

Figure 13:
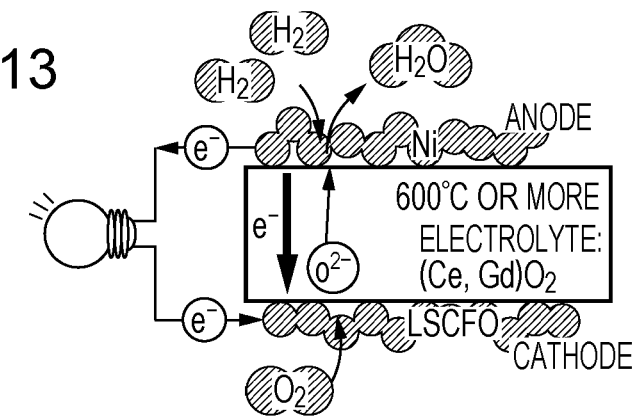
FIG. 13 is a schematic view showing the movement of oxide ions and electrons when the electrolyte of the fuel cell system shown in each of FIGS. 1 and 2 is an oxide ion/electron mixed conductor electrolyte.

However, as the oxide ion conductor, when a cerium-based electrolyte (such as $Ce_{0.9}Gd_{0.1}O_{1.95}$) is used, as shown in FIG. 13, this electrolyte functions as a mixed conductor of electrons and oxide ions. That is, as shown in FIG. 13, when electrons move to the air electrode 14 from the fuel electrode 15 side through the electrolyte 13, oxygen moves as the oxide ions to the fuel electrode 15 through the electrolyte 13, so that steam is generated by a reaction with hydrogen of the fuel electrode 15. Since this steam generation reaction continuously occurs after the supplying of the hydrogen gas and the humidification water is stopped or after the supplying of the raw material gas and the reforming water is stopped, hydrogen in the remaining gas at the fuel electrode 15 side is consumed, and hence, the hydrogen concentration in the remaining gas can be decreased to a safe concentration.

In addition, FIG. 12 is a view schematically showing the movement of oxide ions when the electrolyte 13 of the fuel cell system 100 of each of FIGS. 1 and 2 is an oxide ion conductor electrolyte. FIG. 12 shows one example of a power generation principle when the cell 12 of the fuel cell system 100 uses an oxide ion conductor electrolyte as the electrolyte 13.

In addition, FIG. 13 is a view schematically showing the movement of oxide ions and electrons when the electrolyte 13 of the fuel cell system 100 of each of FIGS. 1 and 2 is an oxide ion/electron mixed conductor electrolyte. FIG. 13 shows one example of a power generation principle when the cell 12 of the fuel cell system 100 uses an oxide ion/electron mixed conductor electrolyte, such as a cerium-based electrolyte, as the electrolyte 13.

(Correlation Between Temperature and Voltage of Fuel Cell Stack with Fuel Gas Concentration)

The correlation between the temperature and the voltage of the fuel cell stack 11 obtained when the hydrogen concentration in the remaining gas at the fuel electrode 15 side is out of the combustion range is theoretically represented by the following equation (5) when the electrolyte 13 of the cell 12 is a proton conductor electrolyte.

First, when the conductivity of protons in the proton conductor is sufficiently high as compared to the conductivity of others, such as holes, and when the influence of holes and the like can be ignored, the value of a voltage V (proton) of the fuel cell stack 11 can be represented by Nernst equation as shown in Equation (5).

$$V(proton)=RT/4F\times ln[\{P(H_2)a\}^2/\{P(H_2)c\}^2] \quad (5)$$

In the above equation, T represents the absolute temperature of the fuel cell stack 11, and R represents the gas constant and is 8.314 kJ/mol. F represents Faraday constant and is 96,485 C/mol. In addition, P(H$_2$)a represents a H$_2$ partial pressure of the fuel electrode 15, and P(H$_2$)c represents a H$_2$ partial pressure of the air electrode 14.

In addition, $\{P(H_2)c\}^2$ can be represented by the following equation (8) using the pressure equivalent constant: Kp derived from the following equations (6) and (7).

$$2H_2+O_2=2H_2O \quad (6)$$

$$Kp=\{P(H_2O)c\}^2/[\{P(H_2)c\}^2 \cdot P(O_2)c] \quad (7)$$

$$\{P(H_2)c\}^2=[\{P(H_2O)c\}^2/P(O_2)c] \cdot 1/Kp \quad (8)$$

In the above equations, P(H$_2$O)c represents a partial pressure of H$_2$O of the air electrode, and P(O$_2$)c represents a partial pressure of O$_2$ of the air electrode. Hence, Nernst equation of the above equation (5) can be represented by the following equation (9) using the correlation between the equations (7) and (8).

$$V(proton)=RT/4F\times ln[Kp\cdot\{(P(H_2)a\}^2/[\{P(H_2O)c\}^2\cdot P(O_2)c]] \quad (9)$$

On the other hand, when the electrolyte 13 of the cell 12 is an oxide ion electrolyte, and in particular, when the oxide ion conductivity, such as that of YSZ, is sufficiently higher than that of another conductive carrier, the value of the voltage V (oxide ion) can be represented by Nernst equation shown in the equation (10). In addition, P(O$_2$)a represents an O$_2$ partial pressure of the fuel electrode 15, and P(O$_2$)c represents an O$_2$ partial pressure of the air electrode.

$$V(\text{oxide ion})=RT/4F\times ln[P(O_2)a/P(O_2)c] \quad (10)$$

In addition, from the above equation (6), the following equations (11) and (12) can be derived. In the equations, $P(O_2)a$ represents an $O_2$ partial pressure of the fuel electrode.

$$Kp=\{P(H_2O)a\}^2/[\{P(H_2)a\}^2 \cdot P(O_2)a] \quad (11)$$

$$P(O_2)a=\{P(H_2O)a\}^2/\{P(H_2)a\}^2 \cdot 1/Kp \quad (12)$$

In the above equations, $P(H_2O)a$ represents a $H_2O$ partial pressure of the fuel electrode, and $P(H_2)a$ represents a $H_2$ partial pressure of the fuel electrode. In addition, the following equation (13) can be derived from the equations (10), (11), and (12).

$$V(\text{oxide ion})=RT/4F\times\ln[\{P(H_2O)a\}^2/\{P(H_2)a\}^2/\{P(O_2)c\cdot Kp\}] \quad (13)$$

Figure 14:
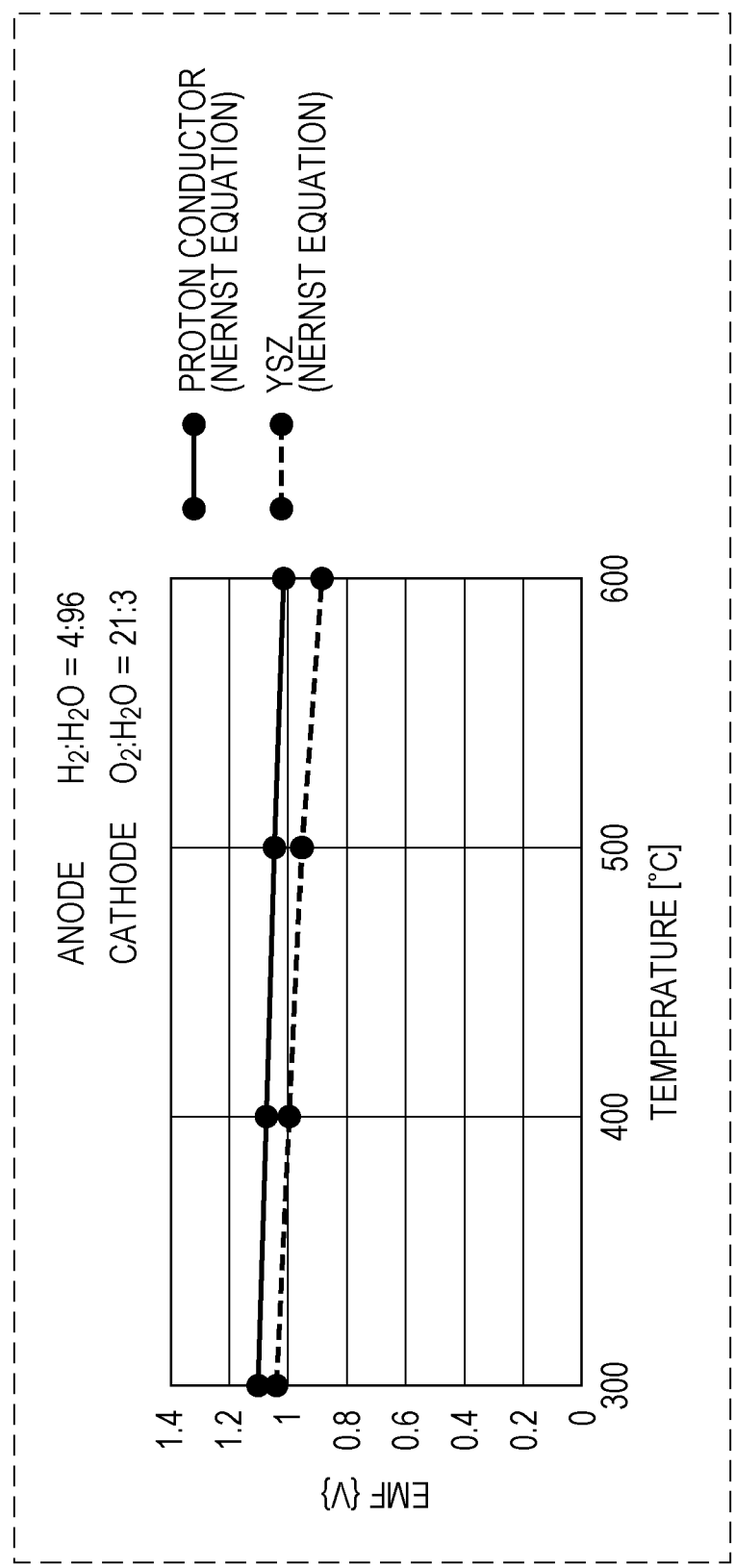
FIG. 14 is a graph showing one example the correlation between the temperature and the voltage of the fuel cell stack of the fuel cell system shown in FIG. 1 when the concentration of hydrogen at a fuel electrode side is out of a combustion range (4.0%)
Figure 15:
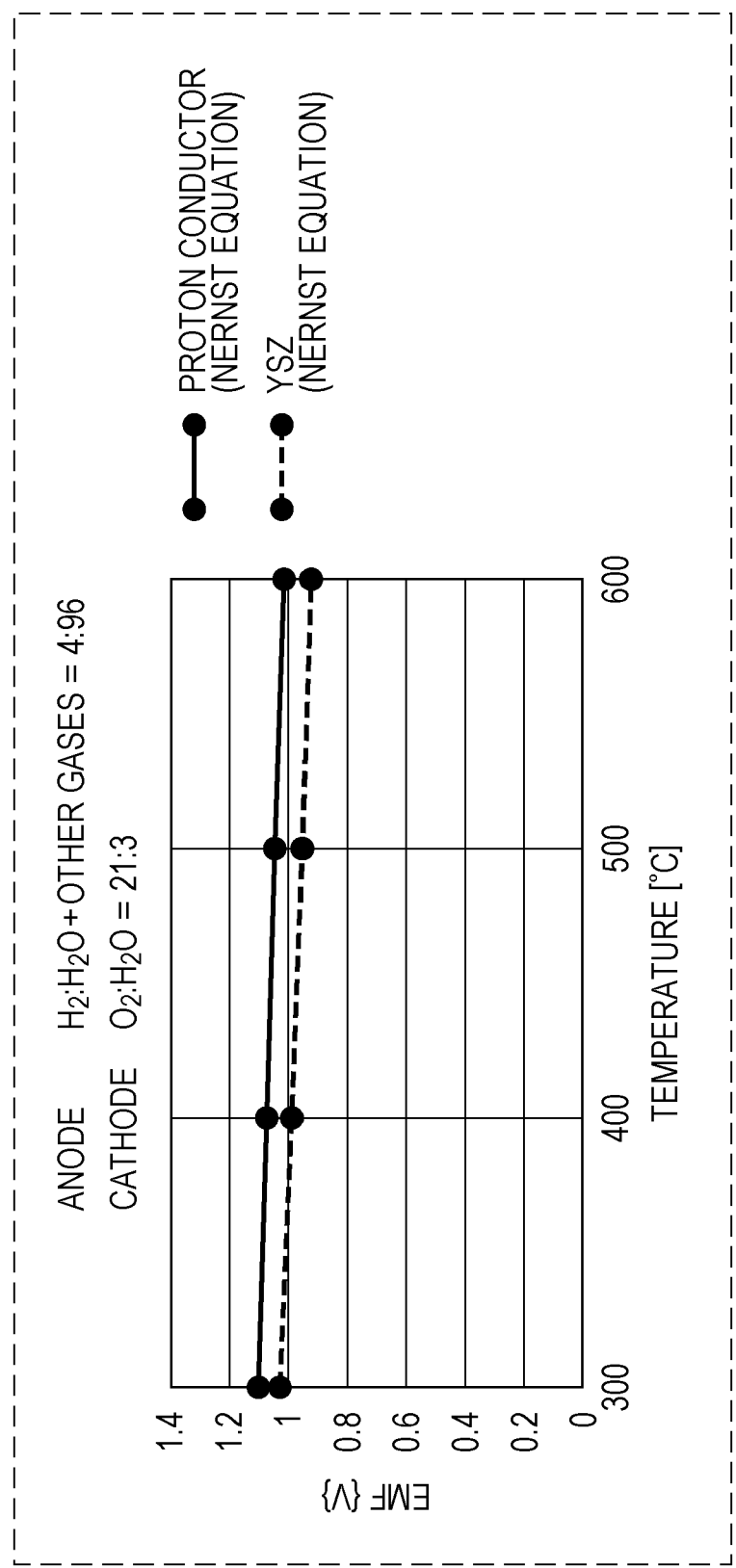
FIG. 15 is a graph showing one example the correlation between the temperature and the voltage of the fuel cell stack of the fuel cell system shown in FIG. 2 when the concentration of hydrogen at a fuel electrode side is out of the combustion range (4.0%)

In the case in which the hydrogen concentration in the remaining gas is 4.0% which is lower than the lower explosive limit, the voltages of the fuel cell stack 11 derived from the equations (9) and (13) are plotted at different temperatures, and the results thereof are shown in FIGS. 14 and 15, respectively. FIG. 14 is a graph in which in the fuel cell system 100 shown in FIG. 1, one example of the correlation between the temperature and the voltage of the fuel cell stack 11 is shown when the hydrogen concentration at the fuel electrode 15 side is out of the combustion range (4.0%). FIG. 15 is a graph in which in the fuel cell system 100 shown in FIG. 2, one example of the correlation between the temperature and the voltage of the fuel cell stack 11 is shown when the hydrogen concentration at the fuel electrode 15 side is out of the combustion range (4.0%). In FIGS. 14 and 15, when the electrolyte 13 of the cell 12 is an oxide ion electrolyte (YSZ), the correlation between the temperature and the voltage (EMF: electromotive force) of the fuel cell stack 11 obtained by Nernst equation is shown by a dotted line. In addition, when the electrolyte 13 of the cell 12 is a proton conductor electrolyte, the correlation between the temperature and the voltage (EMF: electromotive force) of the fuel cell stack 11 obtained by Nernst equation is shown by a solid line.

In addition, in the graphs of FIGS. 14 and 15, at the fuel electrode side, $P(H_2)a$ and $P(H_2O)a$ are changed in ranges of 0.9 to 0.0001 bar and 0.1 to 0.9999 bar, respectively, and at the air electrode side, $P(O_2)c$ and $P(H_2O)c$ are set constant at 0.21 bar and 0.03 bar (each corresponding to the saturated vapor pressure at 25° C.), respectively.

In addition, in the graphs shown in FIGS. 14 and 15, from 300° C. to 600° C., values plotted with 100° C. intervals are linearly interpolated. As shown in FIGS. 14 and 15, when the correlation between the temperature and the voltage of the fuel cell stack 11 is in a region located at a lower side than the graph shown by the dotted line or the graph shown by the solid line, it may be estimated that the hydrogen concentration in the remaining gas at the fuel electrode 15 side of the cell 12 is out of the combustion range and is lower than 4.0%.

However, when the influence of holes and the like to the value of the voltage V (proton) of the fuel cell stack 11 cannot be ignored, as shown in FIGS. 16 and 17, the present inventors found that the result obtained by Nernst equation does not coincide with the result obtained by actual measurement. FIG. 16 is a graph in which in the fuel cell system 100 shown in FIG. 1, one example of the correlation between the temperature and the voltage of the fuel cell stack 11 is shown when the hydrogen concentration at the fuel electrode 15 side is out of the combustion range (4.0%). FIG. 17 is a graph in which in the fuel cell system 100 shown in FIG. 2, one example of the correlation between the temperature and the voltage of the fuel cell stack 11 is shown when the hydrogen concentration at the fuel electrode 15 side is out of the combustion range (4.0%). In FIGS. 16 and 17, when the electrolyte of the cell 12 is a proton conductor electrolyte, the correlation between the temperature and the voltage (electromotive force: EMF) of the fuel cell stack 11 obtained by Nernst equation is shown by a dotted line. In addition, when the electrolyte of the cell 12 is a proton conductor electrolyte, the correlation between the temperature and the voltage (EMF: electromotive force) of the fuel cell stack 11 measured by voltage measurement (EMF measurement) at an extracted current of zero is shown by a solid line. In the graphs shown in FIGS. 16 and 17, the values plotted with 100° C. intervals from 300° C. to 600° C. are linearly interpolated.

That is, it was found that, as shown in FIGS. 16 and 17, the voltage value (V (proton)) obtained from the equation (9) is different from an experimental value of the voltage measured by the EMF measurement. For example, in FIG. 16, although the voltage obtained at 600° C. from Nernst equation is 1.02 V, the voltage experimentally obtained by the EMF measurement is 0.91 V. Although the voltage obtained at 500° C. from Nernst equation is 1.04 V, the voltage experimentally obtained by the EMF measurement is 0.94 V. Although the voltage obtained at 400° C. from Nernst equation is 1.07 V, the voltage experimentally obtained by the EMF measurement is 0.84 V. In addition, although the voltage obtained at 300° C. from Nernst equation is 1.10 V, the voltage experimentally obtained by the EMF measurement is 0.56 V.

On the other hand, in FIG. 17, although the voltage obtained at 600° C. from Nernst equation is 1.02 V, the voltage experimentally obtained by the EMF measurement is 0.87 V. Although the voltage obtained at 500° C. from Nernst equation is 1.04 V, the voltage experimentally obtained by the EMF measurement is 0.90 V. Although the voltage obtained at 400° C. from Nernst equation is 1.07 V, the voltage experimentally obtained by the EMF measurement is 0.79 V. In addition, although the voltage obtained at 300° C. from Nernst equation is 1.10 V, the voltage experimentally obtained by the EMF measurement is 0.52 V.

In addition, the EMF measurement was performed in such a way that while the fuel gas (hydrogen gas) having the composition shown in each of FIGS. 16 and 17 was supplied to the anode, and air (oxygen) was supplied to the cathode, the voltage (electromotive force) at an extracted current of zero was measured using a voltmeter by changing the temperature of the fuel cell stack 11.

As described above, when the electrolyte 13 is a proton conductor electrolyte, the electrolyte 13 functions as a mixed conductor of a proton conductor and a hole conductor. Hence, as shown in FIGS. 8 and 10, the difference in voltage described above is believed to be generated as the voltage drop caused by the influence of the leak current.

That is, as shown in FIG. 11, in the cell 12, hydrogen in the remaining gas at the fuel electrode 15 side moves as protons to the air electrode 14 through the electrolyte 13, and on the other hand, holes each having a positive charge move in a direction opposite to that of the protons from the air electrode 14 to the fuel electrode 15. Accordingly, by a voltage corresponding to the leak current generated by the movement of holes, the voltage obtained by the EMF measurement is decreased from the voltage obtained by Nernst equation. By this leak current, hydrogen in the fuel electrode 15 moves as protons to the air electrode 14 side through the electrolyte 13. Accordingly, the fuel at the fuel electrode 15 side is decreased, and hence, the hydrogen concentration can be decreased to be lower than the combustion range. At a temperature of 450° C. or more, this influence becomes apparent.

On the other hand, as the temperature is decreased from 450° C., besides the influence of the mixed conductivity of the electrolyte 13, the influence of the shift from the equivalent composition also becomes apparent from a kinetic point of view. At 450° C. or less, the difference from the value obtained by Nernst equation caused by the influence of the latter, that is, the influence of the shift from the equivalent composition, tends to be increased to be larger than the difference from the value obtained by Nernst equation by an electron leak current caused by the mixed conductivity of the electrolyte 13.

Accordingly, when the influence of the leak current of holes and the like may not be ignored by those described above, the judgment in Step S25 is performed using the correlation between the temperature and the voltage of the fuel cell stack 11 obtained from the EMF measurement. In addition, the shift from the equilibrium composition at a low temperature is also required be taken into consideration.

As described above, according to the fuel cell systems 100 according to the embodiment and to the modified example of the embodiment, whether the hydrogen concentration in the remaining gas at the fuel electrode 15 side of the fuel cell stack 11 is decreased to be lower than a predetermined safe concentration or not is confirmed, and then, the operation of the fuel cell system 100 can be stopped. Hence, according to the fuel cell system 100, the probability of explosive bonding caused by hydrogen in the remaining gas at the fuel electrode 15 side can be avoided at the restart.

In addition, when the electrolyte 13 of the cell 12 is a mixed conductor, and in particular, when the electrolyte 13 is formed of an electrolyte material having both a proton conductivity and a hole conductivity, hydrogen in the remaining gas at the fuel electrode 15 side moves as protons to the air electrode 14 through the electrolyte 13 and reacts with oxygen of the air electrode 14 to generate steam. Since this reaction continuously occurs in the fuel cell system 100 according to the embodiment after the supplying of the hydrogen gas and the humidification water is stopped (in the fuel cell system 100 according to the modified example of the embodiment, after the supplying of the raw material gas and the reforming water is stopped), the hydrogen in the remaining gas at the fuel electrode 15 side is consumed, and hence, the concentration thereof can be decreased to a safe concentration.

As described above, in the fuel cell systems 100 according to the embodiment and to the modified example of the embodiment, in order to purge the remaining gas containing hydrogen at the fuel electrode 15 side, no gas is required to be supplied, and the hydrogen concentration can be decreased.

Accordingly, the fuel cell system 100 can be stopped while the safety is secured, and in addition, at a subsequent start, the explosive bonding in the fuel cell system can also be prevented. Hence, this system is useful for a fuel cell system operated at a high temperature by combustion of a cathode-off gas and an anode-off gas.

What is claimed is:

1. A fuel cell system comprising:
a fuel cell stack including a plurality of cells, each of which has a fuel electrode, an air electrode, and an electrolyte, and performs a power generation by a reaction between a fuel gas and air;
a fuel supplier supplying the fuel gas to the fuel electrode;
an air supplier supplying the air to the air electrode;
a voltage detector detecting the voltage of the fuel cell stack; and
a controller programmed to stop the supply of the fuel gas by the fuel supplier and the supply of the air by the air supplier when the voltage of the fuel cell stack detected by the voltage detector is decreased to be lower than a threshold voltage after the power generation of the fuel cell stack is stopped,
wherein the threshold voltage is the voltage of the fuel cell stack at which the concentration of a combustible component in a remaining gas in the fuel electrode is decreased to be lower than a lower limit of a combustion range or is decreased to a predetermined ratio or less of the lower explosive limit.

2. The fuel cell system according to claim 1,
wherein the electrolyte is a mixed conductor having an ion conductivity and an electron conductivity.

3. The fuel cell system according to claim 2,
wherein the mixed conductor is a proton conductor.

4. The fuel cell system according to claim 1, further comprising:
a temperature detector detecting the temperature of the fuel cell stack; and
a storage storing a correlation between the temperature and the voltage of the fuel cell stack,
wherein the threshold voltage is determined based on the correlation and the temperature of the fuel cell stack detected by the temperature detector.

5. The fuel cell system according to claim 4,
wherein the predetermined correlation between the temperature and the voltage of the fuel cell stack is obtained using Nernst equation.

6. The fuel cell system according to claim 4,
wherein the predetermined correlation between the temperature and the voltage of the fuel cell stack is obtained from voltages of the fuel cell stack measured at different zero-current temperatures of the fuel cell stack, wherein an extracted current from the fuel cell stack is zero at each of the zero-current temperatures.

7. The fuel cell system according to claim 1,
wherein the electrolyte contains an oxide containing Ba and Zr.

8. The fuel cell system according to claim 1,
wherein the electrolyte contains an oxide containing Ba, Zr, and M, where M is at least one element selected from the group consisting of Sc, In, Lu, Yb, Tm, Er, Y, Ho, Dy, and Gd.

9. The fuel cell system according to claim 1,
wherein the electrolyte contains $Ba_xZr_yM_zO_{3-\delta}$, where M is at least one element selected from the group consisting of Sc, In, Lu, Yb, Tm, Er, Y, Ho, Dy, and Gd, and $0.9 \leq x \leq 1.0$, $0.6 \leq y \leq 0.90$, $0.1 \leq z \leq 0.4$, and $2.70 \leq 3-\delta \leq 2.95$.

10. The fuel cell system according to claim 1,
wherein the fuel supplier supplies a raw material gas as the fuel gas,
the fuel cell system further comprises:
a reformer which generates a reformed gas by reforming the raw material gas supplied by the fuel supplier using a reforming reaction and which supplies the reformed gas to the fuel electrode;
an evaporator which generates steam by evaporating reforming water and which supplies the steam to the reformer for the reforming reaction; and
a water supplier which supplies the reforming water to the evaporator.

11. A method for stopping a fuel cell system, wherein the fuel cell system comprises:
- a fuel cell stack including a plurality of cells, each of which has a fuel electrode, an air electrode, and an electrolyte, and performs a power generation by a reaction between a fuel gas and air;
- a fuel supplier supplying the fuel gas to the fuel electrode;
- an air supplier supplying the air to the air electrode; and
- a voltage detector detecting the voltage of the fuel cell stack, the method comprising:
- stopping the power generation of the fuel cell stack; and
- when the voltage of the fuel cell stack detected by the voltage detector is decreased to be lower than a threshold voltage, stopping the supplying of the fuel gas by the fuel supplier and the supplying of the air by the air supplier,
- wherein the threshold voltage is the voltage of the fuel cell stack at which the concentration of a combustible component in a remaining gas in the fuel electrode is decreased to be lower than a lower limit of a combustion range or is decreased to a predetermined ratio or less of the lower explosive limit.

* * * * *